Aug. 24, 1965    A. J. H. GOODWIN    3,202,388
VIBRATION ISOLATORS
Original Filed May 5, 1959    11 Sheets-Sheet 1
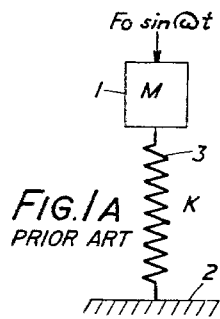
FIG./A.
PRIOR ART
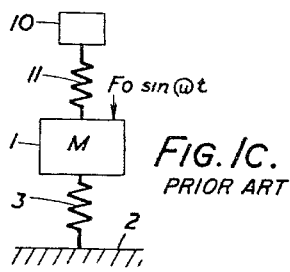
FIG./C.
PRIOR ART
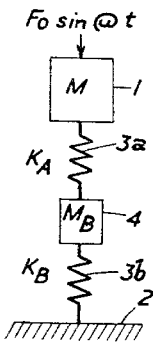
FIG./B.
PRIOR ART
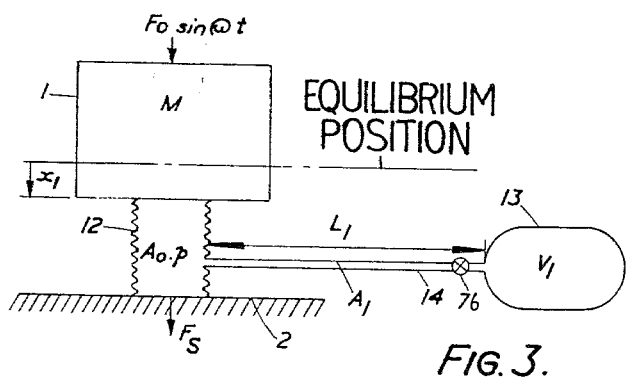
FIG.3.
INVENTOR
AUBREY J. H. GOODWIN
BY
Watson, Cole, Grindle & Watson
ATTORNEY

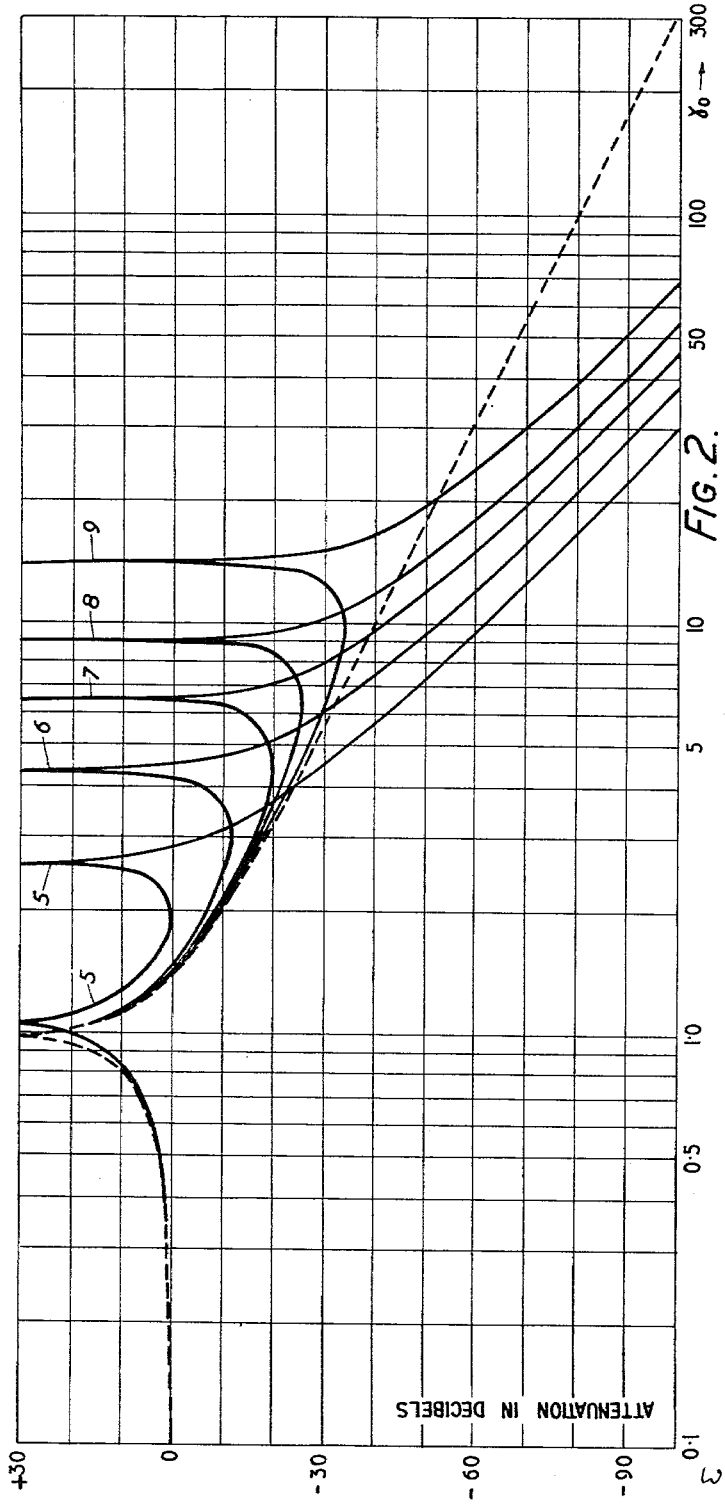

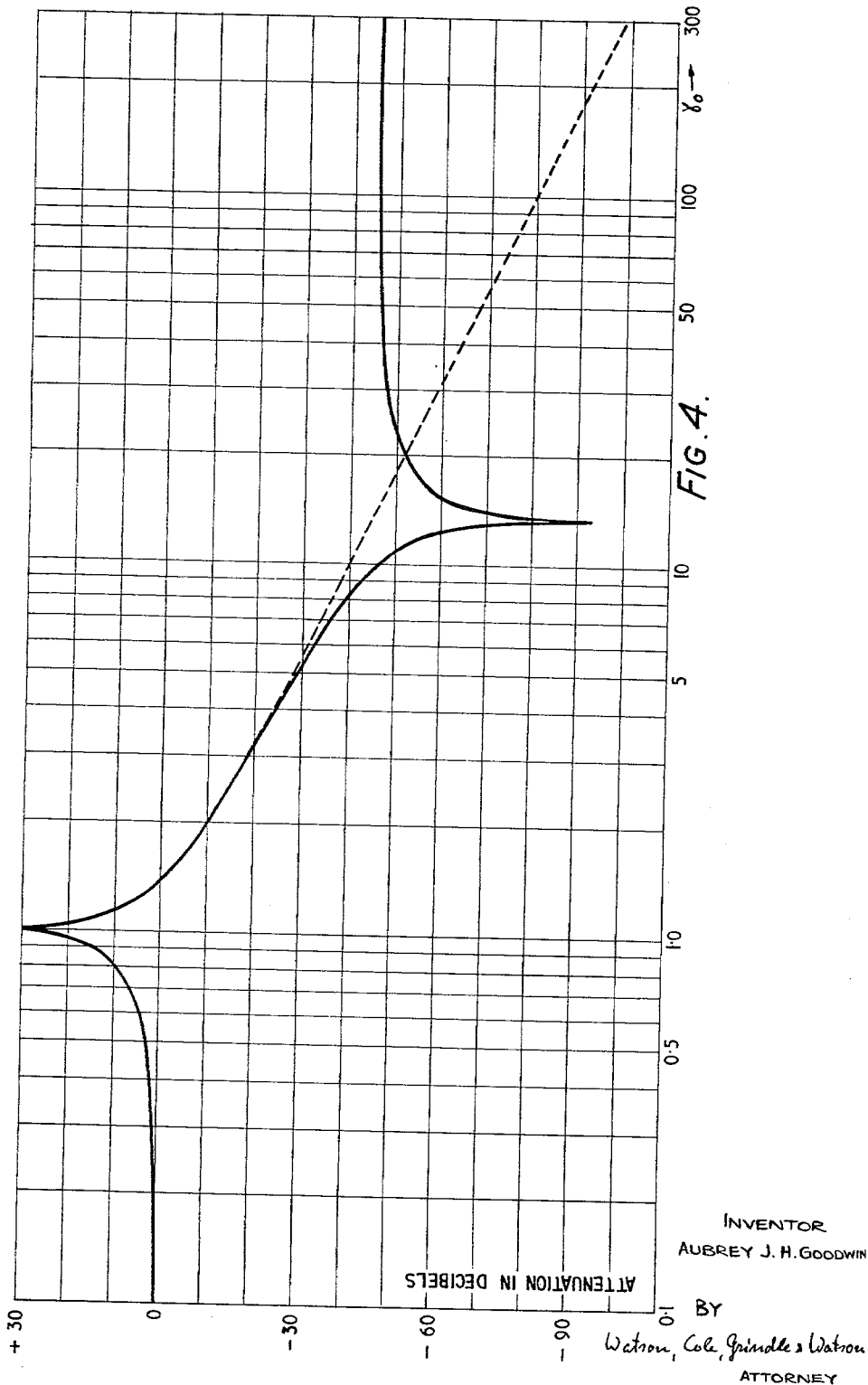

Aug. 24, 1965  A. J. H. GOODWIN  3,202,388
VIBRATION ISOLATORS
Original Filed May 5, 1959  11 Sheets-Sheet 9

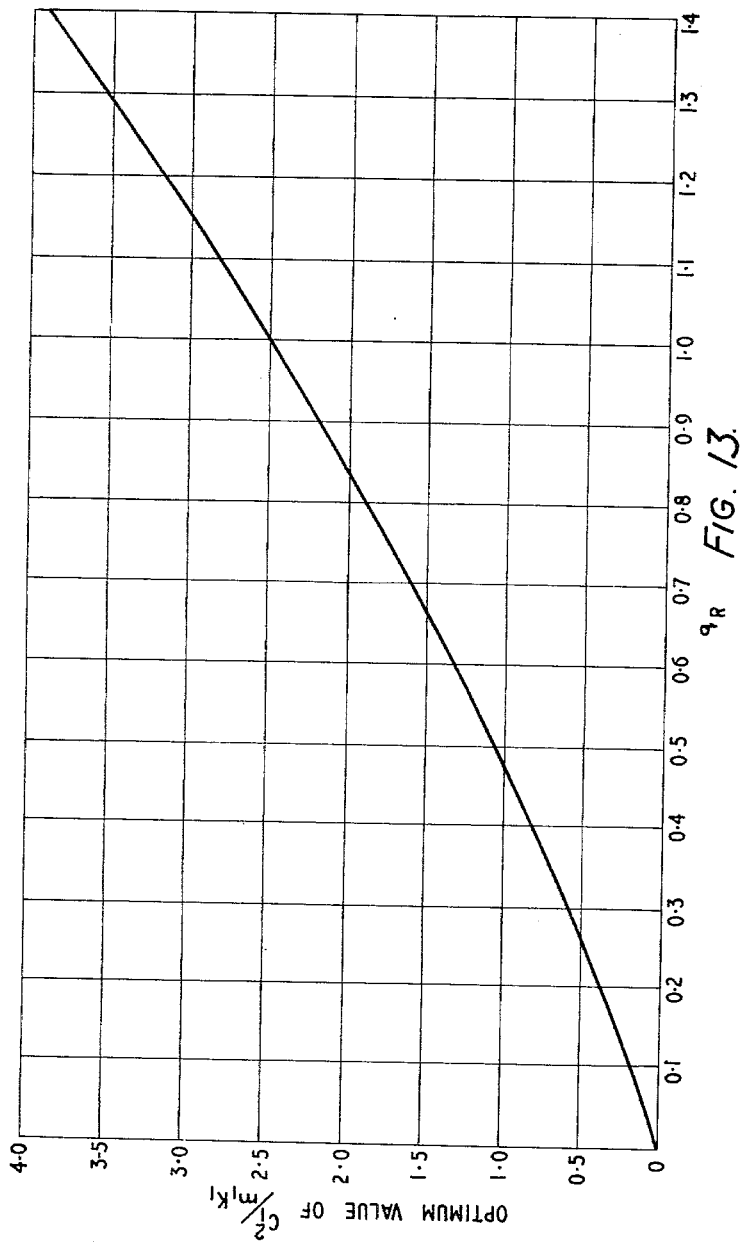

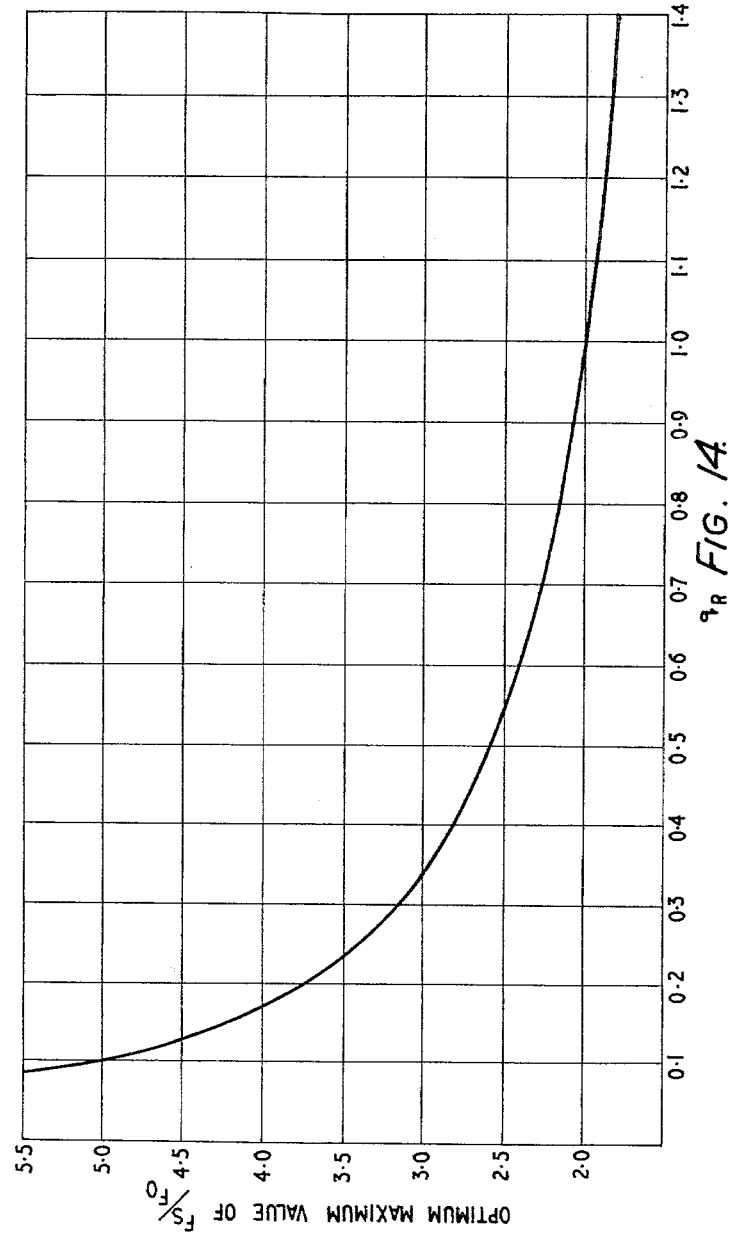

3,202,388
VIBRATION ISOLATORS
Aubrey J. H. Goodwin, Shandon by Helensburgh, Scotland, assignor to Yarrow and Company Limited, Glasgow, Scotland, a British company
Original application May 5, 1959, Ser. No. 811,178, now Patent No. 3,091,103, dated May 28, 1963. Divided and this application May 23, 1963, Ser. No. 282,762
9 Claims. (Cl. 248—8)

Vibration isolators are the subject of my copending patent application Serial No. 811,178 filed May 5, 1959, now Patent No. 3,091,103 issued May 28, 1963, of which this application is a division.

This invention relates to vibration isolators, that is to say, devices for isolating from a first body a periodic force applied to a second body while at the same time transmitting to the first body a constant force applied to the second body.

Throughout the specification, the term "periodic force" is used to mean a force that varies periodically with respect to time or a component of a force, which component varies periodically with respect to time, the term "constant force" is used to mean either a force that remains substantially constant over a single period of the periodic force or a component of a force, which component remains substantially constant over a single period of the periodic force, and the term "isolating" is used to include both not transmitting at all and transmitting with attenuation.

The second body may be, for example, a machine and the first body may be a support for the machine. The vibration isolator would then serve to isolate from the support periodic forces arising from the operation of the machine while at the same time supporting or partially supporting the machine by transmitting the weight, or a part of the weight, of the machine to the support.

An important application of vibration isolators is for mounting the engines of vehicles and vessels. In this case, in addition to a periodic force arising from the operation of the engine and the constant force arising from the weight of the engine, forces arise from the movement of the vehicle or vessel, but such forces usually do not vary significantly over a single period of the periodic force and therefore they form part of the constant force that the vibration isolator must be able to transmit.

The effectiveness of a vibration isolator is measured by its transmissibility, which is defined as the ratio of the force transmitted by the vibration isolator to the force applied to the body. When the applied force is constant, the transmissibility is unity and the displacement of the body is inversely proportional to the static stiffness, which it is desirable should be as large as possible. The transmissibility of the vibration isolator for the periodic force should, however, be as small as possible.

The following is a list of symbols which are used in the specification, together with the meanings assigned to them:

$A_0$—Effective cross-sectional area of the variable-volume container.
$A_1$ and $A_2$—Cross-sectional areas of the ducts to the first and second vessels respectively.
$B_1$ and $B_2$—Bulk moduli of the fluids in the first and second vessels respectively.
$C_1$ and $C_2$—Damping effects of the fluids in the ducts of the first and second vessel and duct systems respectively referred to the variable-volume container.
$F_0$—Amplitude of the applied periodic force.
$F_s$—Amplitude of the periodic force transmitted to the first body.
$K_0$—Static stiffness of a complete vibration mounting.
$K_1$ and $K_2$—Static stiffnesses of the first and second vessel and duct systems respectively referred to the variable-volume container.
$K_A$, $K_B$ and $K_R$—Static stiffnesses of the component conventional type of vibration isolators.
$L_1$ and $L_2$—Lengths of the ducts to the first and second fluid-containing vessels respectively.
$M$—Mounted mass per mounting.
$M_B$—Intermediate mass per mounting.
$V_1$ and $V_2$—Capacities of the first and second fluid-containing vessels respectively.
$X$—Maximum value of the ratio $F_s/F_0$
$Y$—Factor by which the best attenuation of a fluid vibration isolator exceeds the attenuation, at a given frequency, of an equivalent conventional vibration isolator.
$g$—Gravitational acceleration.
$i$—$\sqrt{-1}$
$m_1$ and $m_2$—Virtual masses of the fluids in the ducts of the first and second vessel and duct systems respectively referred to the variable-volume container.
$p$—Pressure of the fluid in the variable-volume container.
$q_2$—Stiffness ratio $K_2/K_1$
$q_B$—Stiffness ratio $K_B/K_1$
$q_R$—Stiffness ratio $K_R/K_1$
$r$—The proportion of the fluid in the variable-volume container working, at any particular frequency, in association with the first fluid-containing vessel of a fluid vibration isolator having two such vessels.
$S$—Stiffness ratio $K_B/K_A$
$t$—Time.
$x_1$—Displacement of the mounted mass from the equilibrium poosition.
$x_2$—Displacement of the intermediate mass from the equilibrium position.
$y$—Displacement from the equilibrium position of the junction between a fluid vibration isolator and a conventional vibration isolator.
$\sin \omega t$—Periodic function of the applied periodic force.
$\Delta_0$—Static deflection of the mounted mass under gravity.
$\gamma$—Forcing frequency ratio for a conventional two-mass vibration isolator, $$=\sqrt{\omega^2\left[\frac{M}{K_A}+\frac{M+M_B}{K_B}\right]}$$

$\gamma_1$—Forcing frequency ratio for the first fluid-containing vessel and associated duct of a fluid vibration isolator incorporating two such vessels $$=\sqrt{\omega^2\frac{m_1}{K_1}}$$

$\gamma_2$—Forcing frequency ratio for the second fluid-containing vessel and associated duct of a fluid vibration isolator incorporating two such vessels, $$=\sqrt{\omega^2\frac{m_2}{K_2}}$$

$\gamma_0$—Forcing frequency ratio for a complete vibration isolator $$=\sqrt{\omega^2\frac{M}{K_0}}$$

$\lambda_1$—Mass ratio $M/m_1$
$\lambda_2$—Mass ratio $M/m_2$
$\lambda_B$—Mass ratio $M/M_B$
$\mu_1$ and $\mu_2$—Coefficients of viscosity of the fluids in the ducts associated with the first and second fluid-containing vessels respectively.
$\nu_1$ and $\nu_2$—Kinematic viscosities of the fluids in the ducts associated with the first and second fluid-containing vessels respectively.

$\rho_1$ and $\rho_2$—Densities of the fluids in the ducts associated with the first and second fluid-containing vessels respectively.

$\omega$—Frequency of the applied periodic force measured in radians per unit time.

$\omega_x$—Frequency of the applied periodic force at which maximum amplification occurs measured in radians per unit time.

$\omega_y$—Frequency of the applied periodic force at which best attenuation occurs measured in radians per unit time.

$n$—Exponent of polytropic expansion and compression of a gas used in a fluid vibration isolator.

In addition to being used to refer to the first vessel and duct system of a fluid vibration isolator having two fluid-containing vessels, the symbols having the suffix 1 are also used to refer to the vessel system of a fluid vibration isolator having only one such vessel.

In order to explain the nature of the problem with which the invention is concerned and to assist in the understanding of the invention, the operation of three forms of anti-vibration mounting that have previously been proposed will now be described in some detail with reference to FIGS. 1A, 1B, 1C and 2 of the accompanying drawings in which:

FIG. 1A shows schematically a simple conventional vibration isolator;

FIG. 1B shows schematically a conventional two-mass vibration isolator;

FIG. 1C shows schematically a dynamic vibration absorber; and

FIG. 2 is a graph comparing the attenuation given by the conventional two-mass vibration isolator shown in FIG. 1B with that given by the simple conventional vibration isolator shown in FIG. 1A over a range of frequencies for different values of the mass ratio of the two-mass vibration isolator.

FIGURE 3 shows schematically a vibration isolator constructed according to this invention;

FIGURE 4 is a graphical representation of the attenuation produced by the vibration isolator shown in FIGURE 3 over a range of frequencies in comparison with the attenuation produced by a simple conventional vibration isolator having the same static stiffness;

FIGURE 13 is a graph showing the relationship between the optimum value of $$C_1^2/m_1K_1$$

Figure 5:
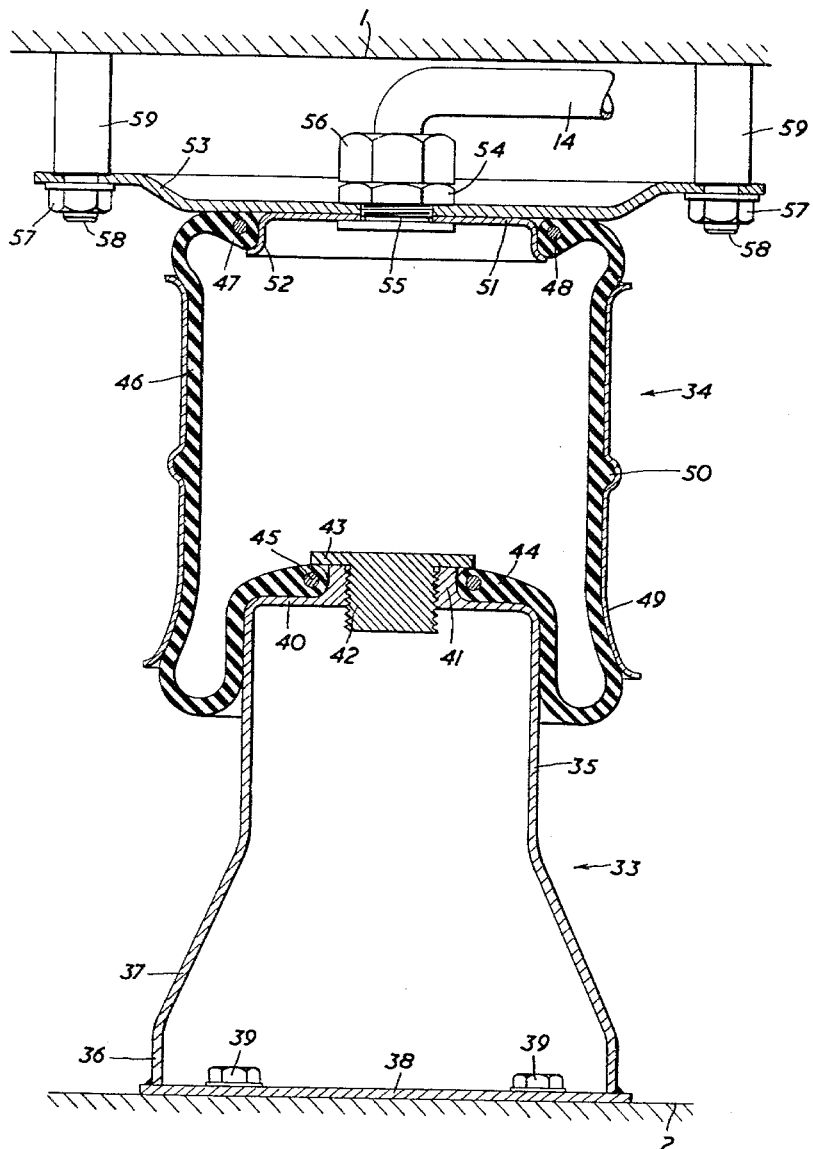
FIGURE 5 is an axial section of a plunger and barrel assembly suitable for use as a variable-volume container of a fluid vibration isolator.

and the value of $q_R$ for the fluid vibration isolator shown in FIGURE 4.

FIGURE 14 is a graph showing the relationship between the optimum value of the transmissibility and the value of $q_R$ for the fluid vibration isolator shown in FIGURE 4.

Throughout the description of the three known forms of anti-vibration mounting, the effects of damping are neglected. In practice, some damping will always be present and this eliminates the sudden phase changes and infinite amplitude that occurs at resonances according to the simplified theory given below, and also reduces the optimum attenuation given by the mounting. The presence of a small degree of damping does not, however, materially alter the behaviour of the mounting when the mounting is not in resonance with the applied periodic force.

The simplest form of anti-vibration mounting is a system having resilience and negligible mass, and such a vibration isolator will hereinafter be referred to as a simple conventional vibration isolator. The transmissibility of such isolators, of which springs and rubber blocks are examples, is a function of the dynamic stiffness (which is assumed for the sake of simplicity to be equal to the static stiffness) of the vibration isolator, the inertia of the body to which the periodic force is applied, and the frequency of the applied force.

Referring to FIG. 1A of the drawings, a periodic force applied to the body 1 is isolated from the support 2 by a simple conventional vibration isolator, which is shown as a spring 3. The force applied to the body 1 causes the body 1 to be displaced from the position that it would occupy if no force were applied to it and the spring 3 were consequently not under load (except for the constant force). This displacement of the body 1 gives rise to two forces: the inertia force of the body 1 (which is proportional to the square of the frequency of the periodic movement of the body 1 and to the displacement of the body 1), and the force arising from the static stiffness of the spring 3 which is exerted equally and oppositely on the body 1 and the support 2. The inertia force, however, acts only upon the body 1. Accordingly, the transmissibility of the vibration isolator depends upon the relative magnitudes and phases of these two forces in relation to the applied force.

At low frequencies, the inertia force is negligible and therefore the stiffness of the spring 3 has to oppose the whole of the applied force. The transmissibility of the vibration isolator under these conditions is effectively unity. In other words, it transmits a constant force without attenuation.

As the frequency rises, the inertia force of the body is initially less than the force exerted by the spring 3, and this implies that the displacement of the body 1 (and consequently the inertia force of the body 1) shall be in phase with the applied force. Under these conditions, the stiffness of the spring 3 has to balance both the applied force and the inertia force of the body 1. Accordingly the force exerted by the spring 3 has to be larger than in the static case and the transmissibility of the isolator is greater than unity. As the frequency increases further, the transmissibility continues to increase until the inertia force of the body 1 becomes equal in magnitude to the force exerted by the spring 3. At the frequency at which this occurs, the system is said to be in resonance and the displacement of the body 1 (and consequently the transmissibilty of the isolator) becomes indefinitely large. Under these conditions, the applied force is not opposed at all because the inertia force of the body 1 and the stiffness of the spring 3 exactly balance each other.

Above the resonant frequency, the inertia force of the body 1 becomes larger than the force exerted by the spring 3, which implies that the displacement of the body 1 (and consequently the inertia force of the body 1) shall be in antiphase with the applied force. The force exerted by the spring 3 is then in phase with the applied force and, consequently, the inertia force of the body 1 has to balance both the applied force and the force exerted by the spring 3. For frequencies only slightly above the resonant frequency, this implies that the maximum displacement of the body 1 (and therefore the transmissibility of the isolator) is large. As the frequency increases further, however, the inertia force of the body 1 (which, as stated above, is proportional to the square of the frequency) increases rapidly so that the inertia force becomes able to balance the applied force and the force exerted by the spring 3 for smaller and smaller maximum displacements of the body 1. This in turn reduces the magnitude of the force exerted by the spring 3, so that the transmissibility of the vibration isolator decreases rapidly.

The frequency at which resonance occurs is a function of the mass of the body 1 and the static stiffness of the spring 3, the resonant frequency increasing with increasing stiffness of the spring 3. Accordingly, the simple conventional vibration isolator suffers from two disadvantages. First, except for frequencies considerably above the resonant frequency of the system, it is not possible to achieve both a low transmissibility and a high static stiffness. Secondly, in order to reach a state in which the vibration isolator is efficient (i.e., the state in which the frequency of the applied force is considerably above the resonant frequency), it is necessary to pass through a region (i.e., the region of resonance) in which the transmissibility is very large. It is possible to reduce the transmissibility of the vibration isolator at resonance by introducing damping, but this increases the transmissibility of the vibration isolator at higher frequencies.

Another form of vibration isolator that has been proposed is a system having resilience and mass, the centre of gravity of the mass being free to move relatively to each of the two bodies to which the vibration isolator is applied. Such a vibration isolator will hereinafter be referred to as a conventional two-mass vibration isolator, the term "two-mass" arising from the fact that the isolator utilises both the inertia force of the body to which the periodic force is applied and the inertia force of the mass of the vibration isolator itself.

Referring to FIG. 1B of the drawings, a periodic force applied to the body 1 is isolated from the support 2, by a conventional two-mass vibration isolator, which consists of springs 3a and 3b, between which there is interposed a massive body 4.

The characteristics of the conventional two-mass vibration isolator differ from those of the simple conventional vibration isolator in that it has two resonant frequencies and that, at frequencies considerably higher than the higher of the two resonant frequencies, a transmissibility much lower than that of a simple conventional vibration isolator having the same static stiffness can be obtained.

The first resonance occurs when the inertia force of the body 1 exactly balances the force exerted by the spring 3a. At frequencies close to this resonant frequency, it requires a very large amplitude of movement of the body 1 in order that the applied periodic force may be balanced by the difference between the inertia force of the body 1 and the force exerted by the spring 3a. This results in a large force being exerted by the spring 3a on the body 4, which therefore has a large amplitude of movement so that large forces are transmitted by the spring 3b to the support 2.

The second resonance occurs when the inertia force of the body 4 exactly balances the resultant of the forces exerted by the springs 3a and 3b. At frequencies close to this resonance frequency, the body 4 has to have a very large amplitude of movement in order that the difference between the inertia force of the body 4 and the resultant of the forces exerted by the springs 3a and 3b shall balance any additional force exerted by the spring 3a resulting from movement of the body 1. Therefore large forces are transmitted by the spring 3b to the support 2.

At frequencies higher than the second resonance frequency, the movement of the body 1 is in antiphase with the applied periodic force and, as in the case of the simple conventional vibration isolator, at very high frequencies only a small amplitude of movement of the body 1 is required for its inertia force to balance both the applied periodic force and the force exerted on it by the spring 3a. Therefore, the spring 3a exerts only small force on the body 4, the inertia force of which balances both this force and the force exerted by the spring 3b with only a very small amplitude of movement of the body 4.

Thus the transmissibility of the conventional two-mass vibration isolator is very low indeed at high frequencies. In fact, at very high frequencies, the transmissibility of a conventional two-mass vibration isolator is smaller than that of a simple conventional vibration isolator having the same static stiffness by a factor which is approximately proportional to the square of the frequency of the applied periodic force. This is shown in FIG. 2 of the drawings, which is a graph in which the vertical axis represents the attenuation or amplification measured in decibels and the horizontal axis represents $\gamma_0$, which, as will be seen below, is a quantity linearly proportional to the frequency of the applied periodic force. The full curves represent the attenuation given by conventional two-mass vibration isolators having the same static stiffness, but different values of $\lambda_B$ (the ratio of the mass M of the body 1, to the mass $M_B$ of the body 4). The broken curve represents the attenuation given by a simple conventional vibration isolator having the same static stiffness. The curve 5 represents the attenuation when $\lambda_B = 1$, that is to say, when the mass $M_B$ of the body 4 is equal to the mass M of the body 1. The curves 6, 7, 8 and 9 represent the attenuation when the value of $\lambda_B$ is 4, 10, 20 and 50 respectively.

It will be seen that the performance of the conventional two-mass vibration isolator improves as the value of $\lambda_B$ decreases. As the value of $\lambda_B$ increases (that is to say, as the mass $M_B$ of the body 4 decreases), the value of the minimum frequency for which the attenuation provided by the conventional two-mass vibration isolator is better than the attenuation provided by a simple conventional vibration isolator having the same static stiffness, increases. Thus, as $\lambda_B$ increases, it is necessary to operate at higher and higher frequencies in order to obtain satisfactory attenuation.

The conventional two-mass vibration isolator suffers from the same disadvantages as the simple conventional vibration isolator, but gives improved attenuation at high frequencies at the expense of being more massive.

A further form of anti-vibration mounting that has been proposed is the so-called dynamic vibration absorber. Referring to FIGURE 1C of the drawings, a body 1, to which the periodic force is to be applied, is separated from the support 2 by a spring 3 as in the simple conventional vibration isolator. On the side of the body 1 remote from the support 2 (i.e., above the body 1 in the form of vibration absorber shown in FIGURE 1C) a body 10 is secured to the body 1 through a spring 11.

The dynamic vibration absorber operates in the following way. The periodic force applied to the body 1 causes the body 1 to vibrate and this in turn causes the body 10 to vibrate. At some particular frequency (the resonance frequency of the system consisting of the body 10 and spring 11), the inertia force of the body 10 exactly opposes the said periodic force. At this frequency, the body 1 is held motionless.

The dynamic vibration absorber gives very good attenuation at one particular frequency, but it has two resonances at which the transmissibility is very large and it is only suitable for isolating a periodic force of which the frequency remains accurately constant. Therefore it is not satisfactory as a mounting for variable-speed machines such as, for example, internal combustion engines used as power units for vehicles or vessels.

Thus none of the anti-vibration mountings described above gives the desired combination of a high static stiffness and a low transmissibility, except at high frequencies or at one particular frequency only.

This invention provides a vibration isolator for isolating from a first body a periodic force applied to a second body while at the same time transmitting to the first body a constant force applied to the second body, which vibration isolator comprises a variable-volume fluid-filled container for interposition between the said two bodies, a vessel containing a fluid, which provides substantially the whole of the static stiffness of the vibration isolator, conduit means of which the effective cross-sectional area is less than the effective cross-sectional area of the said container, which contains a body of fluid and which communicates with both the interior of the said container and the interior of the said vessel and provides the sole means of such communciation, wherein relative movement between the two said bodies in the said one sense causes fluid to flow in the conduit means towards the vessel against the pressure of the fluid in the vessel and relative movement between the said bodies in the opposite sense causes fluid to flow in said conduit means towards the variable-volume container under the action of the pressure of the fluid in the vessel.

Because the apparent bulk modulus of the fluid in the vessel opposes displacement of the body of fluid in the conduit means towards the vessel and relative movement between the bodies under the action of the constant force necessarily produces such a displacement, the force arising from the apparent bulk modulus of the fluid in the vessel opposes relative movement between the two bodies under the action of the constant force. When the frequency of the applied periodic force is very low, the inertia forces of the second body and of the body of fluid in the conduit means are negligible and the applied periodic force is balanced entirely by the force arising from the apparent bulk modulus of the fluid in the vessel. As the frequency of the applied periodic force increases, however, the said inertia forces also increase until a frequency is reached at which they exactly balance the force arising from the apparent bulk modulus of the fluid in the vessel. At this frequency, the applied periodic force is unopposed and the amplitude of the movement of the second body becomes large, which results in a high transmissibility. As the frequency increases further, the inertia forces become larger than the force arising from the apparent bulk modulus of the fluid in the vessel and partially balance the applied periodic force until a frequency is reached at which the inertia force of the body of fluid in the conduit means exactly balances the force exerted on that body of fluid by the fluid in the vessel, so that the stiffness of the vibration isolator at this frequency is (neglecting damping) zero, and the second body responds freely to that force. The amplitude of vibration of the second body then reaches a value at which the inertia force of the second body exactly balances the applied periodic force, which is therefore not directly transmitted to the first body.

It will be seen that, while the vibration isolator of the invention resembles the conventional two-mass vibration isolator and the dynamic vibration absorber in that it has a significant mass (that is, the body of fluid in the conduit means) which gives rise to an inertia force, it is distinguished structurally from them by the fact that, in the vibration isolator of the invention, the mass of the vibration isolator is not resiliently connected directly to the bodies between which it acts. Further, the three anti-vibration mountings described above and the vibration isolator of the invention operate in fundamentally different ways. The principles of operation of the devices may be summarized as follows:

(1) In the simple conventional vibration isolator operating at frequencies well above the resonance frequency, the applied force and the force resulting from the stiffness of the vibration isolator are in phase and their resultant is balanced by the inertia force of the second body.

(2) The principle of operation of the conventional two-mass vibration isolator is similar to that of the simple conventional vibration isolator, but the mass of the vibration isolator itself gives rise to an inertia force that provides additional attenuation.

(3) In the dynamic vibration absorber operating at the frequency of best attenuation, the inertia force of the additional mass exactly balances the applied force. Thus the second body remains stationary and has no inertia force. The static stiffness of the vibration absorber does not give rise to any periodic force because the body that it supports remains stationary.

(4) In the vibration isolator of the invention operating at the frequency of best attenuation, the inertia force of the body of fluid in the conduit means exactly balances the periodic force arising from the static stiffness of the vibration isolator, and the inertia force of the second body exactly balances the applied force.

Although the transmissibility of the vibration isolator of the invention at resonance is (neglecting damping) zero, it is necessary to provide a support for the resilient means and a residual periodic force is transmitted to that support through the resilient means. This residual periodic force may, however, be reduced or eliminated as will be described below.

In all forms of the vibration isolator of the invention, it is essential that the vibration isolator should be suitably damped in accordance with the purpose to which it is to be applied, and this is discussed in greater detail below.

The variable-volume fluid-filled container may comprise a cylinder fitted with a piston slidable therein and filled, on one side of the piston, with a liquid, but such sliding parts almost inevitably result in some leakage and preferably, the container is, with the exception of an outlet to the conduit means, completely sealed. Thus the container may comprise a chamber fitted with a flexible diaphragm and filled, on one side of the diaphragm, with a liquid, or the container may comprise a flexible bellows filled with a liquid.

The fact that the effective cross-sectional area of the variable-volume fluid-filled container is greater than the effective cross-sectional area of the conduit means so that the magnitude of the displacement of the centre of mass of the fluid in the conduit means caused by a given relative movement between the said bodies is greater than the magnitude of the said relative movement results in two advantages. First, the effective inertia of the vibration isolator exceeds the mass of the fluid in the conduit means by a factor equal to the square of the ratio of the two effective cross-sectional areas. Secondly, because the said opposing force acts directly on the mass, the magnitude of the said opposing force required to prevent relative movement between the two bodies under the action of a given constant force is less than the magnitude of that constant force. Therefore, the residual periodic force referred to above is reduced. Thirdly, the relatively large amplitude of movement of the fluid in the conduit means gives rise to a degree of damping that can readily be controlled (by selection of a fluid having an appropriate coefficient of viscosity and a conduit means having an appropriate cross-sectional area) and which is large by comparison with any damping provided by the remainder of the vibration isolator. Further, the introduction of a substantial degree of damping can be achieved with the application of only relatively small forces. The effective cross-sectional area of the container may exceed the effective cross-sectional area of the conduit means by a factor within the range of from 10 to 100. For some applications, this factor advantageously exceeds 100 and, for some applications, it preferably exceeds 1,000.

The fluid in the said vessel may be a liquid and there may be provided in the vessel, in order to reduce the apparent bulk modulus of the liquid in the vessel, a resilient body of which the bulk modulus is less than the bulk modulus of the liquid in the vessel. The resilient body may be a body of gas which may be contained in a sealed bag. Instead, in order to provide additional resilience when the fluid in the vessel is a liquid, the vessel may be provided with a resilient diaphragm or a resiliently loaded piston or diaphragm.

As has been stated above, it is important that the vibration isolator should be suitably damped for the purpose to which it is to be applied and there may be provided an adjustable throttle valve for varying the magnitude of the viscous damping of the fluid in the conduit means (which usually amounts to substantially all the damping of the vibration isolator, the other sources of damping within the vibration isolator being negligible by comparison).

The non-dimensional quantity $$C_1^2/m_1K_1$$

may be within the range of from 0.5 to 2.5. For some applications it may be within the range of from 0.05 to 0.5 and for other applications it may be not greater than 0.0001. This quantity is a function of the damping of the vibration isolator and gives a measure of the selectivity of the vibration isolator with respect to the frequency of the applied periodic force. Small values of the quantity correspond to a high selectivity, that is to say, a vibration isolator for which the quantity is small has a very low transmissibility at some particular frequency, but the transmissibility rises sharply on either side of that frequency. A vibration isolator for which the value of the quantity is large, on the other hand, gives a less good performance (that is to say, a higher transmissibility) at its optimum frequency of operation, but the transmissibility rises less sharply on either side of the optimum frequency.

Vibration isolators for which the value of $$C_1^2/m_1K_1$$

is very small (that is to say, less than 0.0001) are suitable for use when the frequency of the periodic force remains approximately constant for in this case it is desirable to produce the greatest possible degree of attenuation at the frequency of the applied force. Vibration isolators for which the value of the said quantity is larger (say 0.2 and preferably less than 0.5) are suitable for reducing the amplitude of vibration at resonance of a mechanism having a natural frequency, for example, a body mounted on a conventional vibration isolator. The resulting system has two resonance frequencies, one at a lower and the other at a higher frequency than the natural frequency of the mechanism by itself and it is necessary that the fluid vibration isolator should provide good attenuation over a frequency range which includes both the resonance frequencies of the system.

If it is desired to provide good attenuation at two or more considerably different frequencies, there may be provided at least one (the number being at least one less than the number of considerably different frequencies at which it is desired to produce good attenuation) additional conduit means and associated vessel containing a fluid, the or each additional conduit means communicating both with the interior of the variable-volume container and with the interior of the said associated vessel and providing the sole means of such communication, the container, the first-mentioned conduit means and vessel, and the or each additional conduit means and associated vessel together forming a closed fluid-filled system. Such a vibration isolator may be used, for example, when it is required both that very good attenuation should be provided at one particular frequency and that the maximum amplification of the vibration isolator should be low. The first of these requirements implies that the degree of damping, and therefore the value of $C_1^2/m_1K_1$ shall be small, but, in the case of a single-vessel vibration isolator, the second requirement could be met only by making $$C_1^2/m_1K_1$$

large. If an additional conduit means and associated vessel is provided, however, it is often possible to meet both requirements by choosing the parameters of the vibration isolator correctly. Thus, there may be provided only a single additional conduit means and associated vessel containing a fluid, the value of $$C_1^2/m_1K_1$$

being within the range of from 0.01 to 0.1 and the value of $C_2^2/m_2K_2$ (as hereinafter defined) being not greater than 0.0001. Such a vibration isolator may be regarded as consisting of two systems. The second system (that to which the quantities having the suffix 2 apply) has small damping and provides the required very good attenuation, and the first system (that to which the quantities having the suffix 1 apply) has a higher degree of damping and produces a useful degree of attenuation at both the frequencies at which amplification occurs (the fact that there are two systems having different characteristic frequencies results in amplification of the periodic force at two different frequencies). While giving a correct general idea of the way in which such a two-vessel vibration isolator operates, it is in an oversimplification to regard the vibration isolator as consisting of two distinct systems in this way. The procedure for selecting the correct values of the parameters for a particular application is discussed in greater detail below.

The invention also provides a vibration isolating device comprising a vibration isolator of the invention connected in series with a simple conventional vibration solator (as hereinbefore defined), the part of the simple conventional vibration isolator that is connected to the first-mentioned vibration isolator constituting the said second body. Usually, in such a device the simple conventional vibration isolator provides the desired very good attenuation over a range of high frequencies and the purpose of the vibration isolator of the invention is to provide attenuation at what would, in the absence of the vibration isolator of the invention, be the resonance frequency of the system. In fact, the presence of two vibration isolators having different characteristic frequencies results in amplification occurring at two different frequencies and thus the degree of damping of the vibration isolator of the invention has to be sufficiently large to provide a useful degree of attenuation at both these frequencies. For this purpose the value of $C_1^2/m_1K_1$ is advantageously within the range of from 0.05 to 0.5.

In another vibration isolating device according to the invention, a vibration isolator according to the invention is connected in series with a conventional two-mass vibration isolator (as hereinbefore defined), the part of the conventional two-mass vibration isolator that is connected to the first-mentioned vibration isolator constituting the said second body. Advantageously, the vessel and fluid contained by the vessel of the fluid vibration isolator together constitute the additional mass of the conventional two-mass vibration isolator, and the value of $C_1^2/m_1K_1$ (as hereinafater defined) is within the range of from 0.05 to 0.5.

The invention also provides a system comprising a fluid vibration isolator of the invention, a mechanism which, in the absence of the vibration isolator, would have a natural frequency, and a support, the mechanism constituting the second body, the support constituting the first body, the periodic force being a force arising from the operation of the mechanism, and magnitude of the mass of the said body of fluid in the conduit means of vibration isolator and the stiffness of resilient means being such and the value of $C_1^2/m_1K_1$ (each of the terms $C_1$, $m_1$ and $K_1$ being defined in the specification) being so selected from within the range of from 0.1 to 2.5 that, at the said natural frequency, the vibration isolator will provide a substantial degree of attenuation. The mechanism and the mounted of the vibration isolator may be such that the periodic force is a centrifugal force arising from the rotation of the mechanism or a part thereof. The vibration isolator is here serving as a tuned damper while at the same time transmitting a constant force from the mechanism to the support for the purpose, for example, of supporting the mechanism.

The invention also provides a power unit which comprises and internal combustion engine, a support for the engine and a vibration isolator or vibration isolating device of the invention arranged to transmit at least a part of the weight of the engine to the support. The internal combustion engine may be reciprocating engine and is advantageously a diesel engine.

Referring to FIGURE 3 of the drawings, a periodic force applied to a secondy body 1 is isolated from a first body in the form of a support 2 by a vibration isolator. The vibration isolator comprises a flexible bellows 12 of which the upper end supports the body 1 and the lower end rests on the support 2. The hollow interior of the bellows 12 is placed in communication with the interior of a vessel 13 by a conduit in the form of a straight duct 14. The bellows 12, vessel 13 and duct 14 together constitute a closed fluid-filled system. The bellows 12 may be made of rubber, reinforced rubber or thin metal and the vessel 13 and the duct 14 are made of metal of sufficient strength and rigidity to withstand the imposed stresses.

The vibration isolator operates in the following way. Periodic relative movement between the body 1 and the support 2 causes the bellows to expand and contract periodically and this in turn causes the fluid in the duct 14 to flow to and fro against the resilient action of the fluid in the vessel 13. At the resonance frequency of the vibration isolator, the inertia force of the fluid in the duct 14 exactly balances the resilient force applied by the fluid in the vessel 13 so that the bellows 12 have no stiffness and the body 1 vibrates freely.

Figure 6:
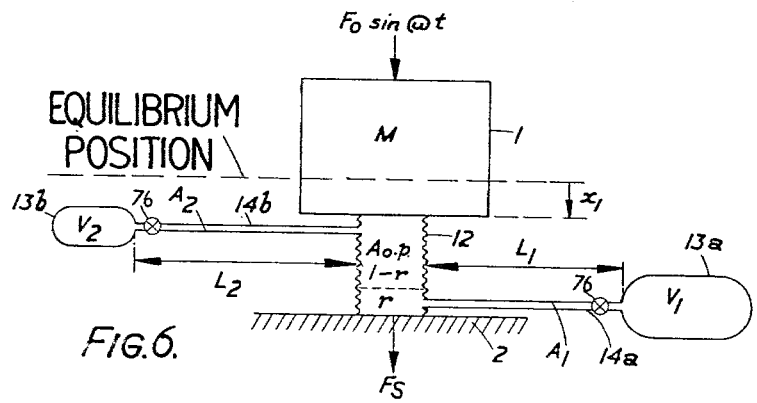
FIGURES 6–8 show schematically three further forms of third vibration isolators constructed in accordance with the invention.

The attenuation provided by a vibration isolator of this type is represented by the full curve in FIGURE 6, the broken curve representing the attenuation provided by a simple conventional vibration isolator having the same static stiffness. It will be seen that the transmissibility of the vibration isolator closely follows that of the simple conventional vibration isolator for low frequencies of the applied periodic force and shows the same resonance peak at which the transmissibility is large. Above the resonance frequency, however, the vibration isolator gives, over a small range of frequencies, a greatly reduced transmissibility.

The mathematical analysis of this vibration isolator is as follows:

Equating the forces at the top of the bellows 12 gives:

$$M\ddot{x}_1 = F_0 \sin \omega t - A_0 p \quad (1)$$

Equating the forces in the duct 14 gives:

$$\rho_1 A_1 L_1 \frac{\ddot{x}_1 A_0}{A_1} = A_1 p - \frac{A_0 x_1}{V_1} B_1 A_1 - 8\pi\mu_1 L_1 \frac{A_0 \dot{x}_1}{A_1} \quad (2)$$

Converting Equation 2 to eqivalent forces in the bellows 12 by multiplying by $A_0/A_1$ gives:

$$\rho_1 A_1 L_1 \left(\frac{A_0}{A_1}\right)^2 \ddot{x}_1 = A_0 p - \frac{A_0^2 B_1}{V_1} x_1 - 8\pi\mu_1 L_1 \left(\frac{A_0}{A_1}\right)^2 \dot{x}_1 \quad (3)$$

or $$m_1 \ddot{x}_1 = A_0 p - K_1 x_1 - C_1 \dot{x}_1 \quad (4)$$

Where—

$$\rho_1 A_1 L_1 \left(\frac{A_0}{A_1}\right)^2 = m_1$$

$$\frac{A_0^2 B_1}{V_1} = K_1$$

and $$8\pi\mu_1 L_1 \left(\frac{A_0}{A_1}\right)^2 = C_1$$

Adding Equations 1 and 4 gives:

$$M\ddot{x}_1 + m_1 \ddot{x}_1 = F_0 \sin \omega t - K_1 x_1 - C_1 \dot{x}_1 \quad (5)$$

Assuming that the motion is simple harmonic and considering the amplitudes of the forces gives:

$$F_0 = |x_1(K_1 - m_1\omega^2 - M\omega^2 + iC_1\omega)| \quad (6)$$

and $$F_s = |A_0 p| \quad (7)$$

but from Equation 4:

$$A_0 p = |x_1(K_1 - m_1\omega^2 + iC_1\omega)| \quad (8)$$

From Equations 6, 7 and 8 it follows that:

$$\frac{F_s}{F_0} = \left|\frac{x_1(K_1 - m_1\omega^2 + iC_1\omega)}{x_1(K_1 - m_1\omega^2 - M\omega^2 + iC_1\omega)}\right| \quad (9)$$

This can be transformed to:

$$\frac{F_s}{F_0} = \sqrt{\frac{(K_1 - m\omega^2)^2 + C_1^2\omega^2}{(K_1 - m_1\omega^2 - M\omega^2)^2 + C_1^2\omega^2}} \quad (10)$$

Dividing Equation 10 by $K_1^2$ gives:

$$\frac{F_s}{F_0} = \sqrt{\frac{\left(1 - \frac{m_1\omega^2}{K_1}\right)^2 + \frac{C_1^2 m_1\omega^2}{m_1 K_1 K_1}}{\left(1 - \frac{m_1\omega^2}{K_1} - \frac{m_1\omega^2 M}{K_1 m_1}\right)^2 \pm \frac{C_1^2 m_1\omega^2}{m_1 K_1 K_1}}} \quad (11)$$

Whence $$\frac{F_s}{F_0} = \sqrt{\frac{(1-\gamma_1^2)^2 + \frac{C_1^2}{m_1 K_1}\gamma_1^2}{(1 - \gamma_1^2 - \lambda_1\gamma_1^2)^2 + \frac{C_1^2}{m_1 K_1}\gamma_1^2}} \quad (12)$$

Where $$\gamma_1^2 = \frac{m_1\omega^2}{K_1} \text{ and } \lambda_1 = \frac{M}{m_1}$$

The value of $$F_s/F_0$$

tends to a minimum (that is to say, the vibration isolator gives best attenuation) when $$1 - \gamma_1^2 = 0 \text{ or } \gamma_1^2 = 1$$

It should be noted that this gives:

$$K_1 = m_1\omega^2$$

Thus, as explained qualitatively above, the vibration isolator gives best attenuation when the inertia force of the fluid in the duct 14 exactly balances the force resulting from the static stiffness of the vibration isolator.

Putting $$\gamma_1^2 = 1 \text{ in Equation 12 gives:}$$

$$\frac{F_s}{F_0}(\min.) = \sqrt{\frac{\frac{C_1^2}{m_1 K_1}}{\lambda_1^2 + \frac{C_1^2}{m_1 K_1}}} \quad (13)$$

The attenuation at this frequency given by a simple conventional vibration isolator of the same satic stiffness can be shown to be approximately $1/\lambda_1$, when $\lambda_1$ is large. Thus, if the fluid vibration isolator is to give at this frequency an attenuation Y times greater than the simple conventional vibration isolator, the following relationship must hold:

$$\frac{1}{Y^2\lambda_1^2} = \frac{\frac{C_1^2}{m_1 K_1}}{\lambda_1^2 + \frac{C_1^2}{m_1 K_1}} \quad (14)$$

Therefore $$\frac{C_1^2}{m_1 K_1} = \frac{\lambda_1^2}{Y^2\lambda_1^2 - 1} \simeq \frac{1}{Y^2} \quad (15)$$

The value of $F_s/F_0$ tends to a maximum (that is to say, the vibration isolator gives maximum amplification) when $$1 - \gamma_1^2 - \lambda_1\gamma_1^2 = 0$$

that is to say, when $$\gamma_1^2 = \frac{1}{1 + \lambda_1}$$

Dividing Equation 12 by $\lambda_1^2$, putting $$\gamma_1^2 = \frac{1}{1 + \lambda_1}$$

and substituting for
from Equation 15 gives:

$$\frac{F_s}{F_0}(\max.) = \sqrt{\frac{\dfrac{C_1^2}{m_1 K_1}}{1+\lambda_2+\dfrac{\lambda_1^2}{Y^2\lambda_2^2-1}}} = X$$

whence $$X^2 = \frac{Y^2\lambda_1^2-1}{1+\lambda_1}+1$$

Now $\lambda_1$ is large and therefore $X \simeq Y\sqrt{\lambda_1}$. Thus, if $Y$ is to be greater than 1 (that is to say, if the single-vessel vibration isolator is to show any advantage over a simple conventional isolator having the same static stiffness) then $X$ must be greater than $\sqrt{\lambda_1}$. Further, if it is required that $Y$ shall be very large (that is to say, that the attenuation at the optimum frequency shall be very good), $X$ must be correspondingly large (that is to say, the maximum amplification given by the vibration isolator must be correspondingly large). Thus, in designing a single-vessel vibration isolator for any particular application, a compromise has to be made between having very good optimum attenuation, which gives large maximum amplication at some other frequency, and having low maximum amplification, which gives poor optimum attenuation.

The procedure in designing a single-vessel vibration isolator for some particular application may be summarised as follows—$M$, $A_0$ and $\Delta_0$ will be known, and we have:

$$K_1 = \frac{Mg}{\Delta_0}$$

and $$V_1 = \frac{A_0^2 B_1}{K_1}$$

In order to find $V_1$, the fluid to be used in the system must first be selected. If a gas is used then $B_1=np$ where $p$ is the absolute pressure. Initially, $n$ may be assumed to be unity. Subsequently, its act value should be determined experimentally. Therefore, with a gas filled system, we have:

$$V_1 = \frac{A_0^2 p}{K_1}$$

Now $$m_1 = \rho_1 A_1 L_1 \left(\frac{A_0}{A_1}\right)^2$$

and therefore $$\frac{L_1}{A_1} = \frac{m_1}{A_0^2 \rho_1}$$

Also $$m_1 = \frac{K_1}{\omega_y^2}$$

(where $\omega_y$ is the frequency at which best attenuation is required). Thus, by assuming a value of $A_1$, it is possible to find $L_1$. Substituting for $C_1$, $m_1$ and $K_1$ in Equation 15 gives:

$$\frac{1}{Y^2} \simeq \frac{(8\pi\nu_1)^2}{\omega_y^2 A_1^2}$$

or $$Y \simeq \frac{A_1 f_y}{4\nu_1}$$

(where $f_y$ is the frequency in cycles per second at which best attenuation is required). From this relation it is possible to see whether or not the assumed value of $A_1$ in fact gives the required degree of attenuation. The value of $\lambda_1$ may be derived from the relation $$\lambda_1 = \frac{M}{m_1}$$

and then the value of $X$ may be found from the relation $$X = Y\sqrt{\lambda_1}$$

Thus it is possible to see whether or not the assumed value of $A_1$ is satisfactory from the point of view of the maximum permissible amplification.

If it does not prove to be possible to achieve the desired optimum attenuation without exceeding the maximum permissible amplification, then it is necessary to use a more complicated system such as, for example, a two-vessel vibration isolator.

The following example illustrates the application of a single-vessel vibration isolator to the mounting of a 6-cylinder 4-stroke diesel engine. The isolator is to support a weight of 1,000 pounds and is to give best attenuation at a frequency of 50 cycles per second, which is the firing frequency when the engine is running at a speed of 1,000 revolutions per minute. Further, the deflection of the vibration isolator under the static load of 1,000 pounds is to be 0.75 inch when the pressure in the bellows is 50 pounds per square inch gauge.

In the following calculation (and in the other calculations set out hereinafter), the numbers are given to a greater number of significant figures than would be justified in practice, in order to indicate clearly the method of calculation. Further, in the interests of simplicity, end effects (that is to say, effects resulting from the flow of fluid between the variable-volume container and the adjacent portion of the duct and between the vessel and the end portion of the duct) have ben neglected. These end effects can, however, materially increase the damping (as compared with the values calculated herein), especially when the fluid in the duct is a gas.

Then $$M = 1000 \text{ pounds}$$

$$A_0 = \frac{1000}{50} = 20 \text{ square inches}$$

and $$\Delta_0 = 0.75 \text{ inch}$$

Therefore $$K_1 = \frac{Mg}{\Delta_0} = \frac{1000}{0.75} = 1333 \text{ pounds per inch.}$$

If air is used in the duct 14 and vessel 13, and liquid is used in the bellows 12, then $$V_1 = \frac{A_0^2 p}{K_1} = \frac{(20)^2(50+14.69)}{1333} = 19.4 \text{ cubic inches}$$

For air at a pressure of 50 pounds per square inch gauge and a temperature of 80° F., $\rho 1 = 0.0001872$ pounds per cubic inch
$\mu 1 = 0.00553$ square inch per second Now $$m_1 = \frac{K_1}{\omega_Y^2} = \frac{1333 \times 32.2 \times 12}{(2\pi \times 50)^2} = 5.217 \text{ pounds}$$

Therefore $$\frac{L_1}{A_1} = \frac{m_1}{A_0^2 \rho_1} = \frac{5.217}{(20)^2 \times 0.0001872} = 69.67 \text{ reciprocal inches}$$

Selecting $A_1 = 0.1$ square inch makes $L_1 = 6.967$ inches

Then $$Y \simeq \frac{A_1 f_y}{4\nu_1} \simeq \frac{0.1 \times 50}{4 \times 0.00553} \simeq 226 \simeq 47.1 \text{ decibels}$$

That is, the attenuation at a frequency of 50 cycles per second is 47.1 decibels beyond that achieved by a simple conventional vibration isolator of equal static stiffness. With this value of $A_1$:

$$\lambda_1 = \frac{M}{m_1} = \frac{1000}{5.217} = 191.7$$

Therefore $$X = Y\sqrt{\lambda_1} = 226 \times \sqrt{191.7}$$

Hence $$X = 3129 = 69.91 \text{ decibels}$$

$$fx = \frac{f_y}{\sqrt{1+\lambda_1}}$$

$$= \frac{50}{\sqrt{1+191.7}}$$

$$= 3.6 \text{ cycles per second}$$

That is, with this value of $A_1$, the system will experience a maximum amplification of about 69.91 decibels when the frequency of the applied force is 3.6 cycles per second (that is to say, when the engine speed is 72 revolutions per minute).

Referring to FIGURE 4 of the drawings, the full curve represents the attenuation provided by the vibration isolator in the above example. The curve also represents, however, the attenuation provided by other such vibration isolators that incorporate a single vessel only and for which $$\frac{K_1}{m_1} = \frac{74065}{\Delta_0 \text{ inches}} \text{ and } \frac{C_1^2}{m_1 K_1} = 0.00002$$

The frequency of the applied periodic force is related to $\gamma_0$ by the following general formula:

frequency of the applied periodic force $$= \frac{3.129\gamma_0}{\sqrt{\Delta_0 \text{ inches}}}$$

cycles per second

Referring to FIG. 6 of the drawings, a periodic force applied to a body 1 is isolated from a support 2 by a two-vessel vibration isolator comprising a flexible bellows 12 of which the upper end supports the body 1 and the lower end rests on the support 2. The hollow interior of the bellows 12 is placed in communication with the interiors of vessels 13a and 13b by conduits which are in the form of straight ducts 14a and 14b respectively.

Figure 9:
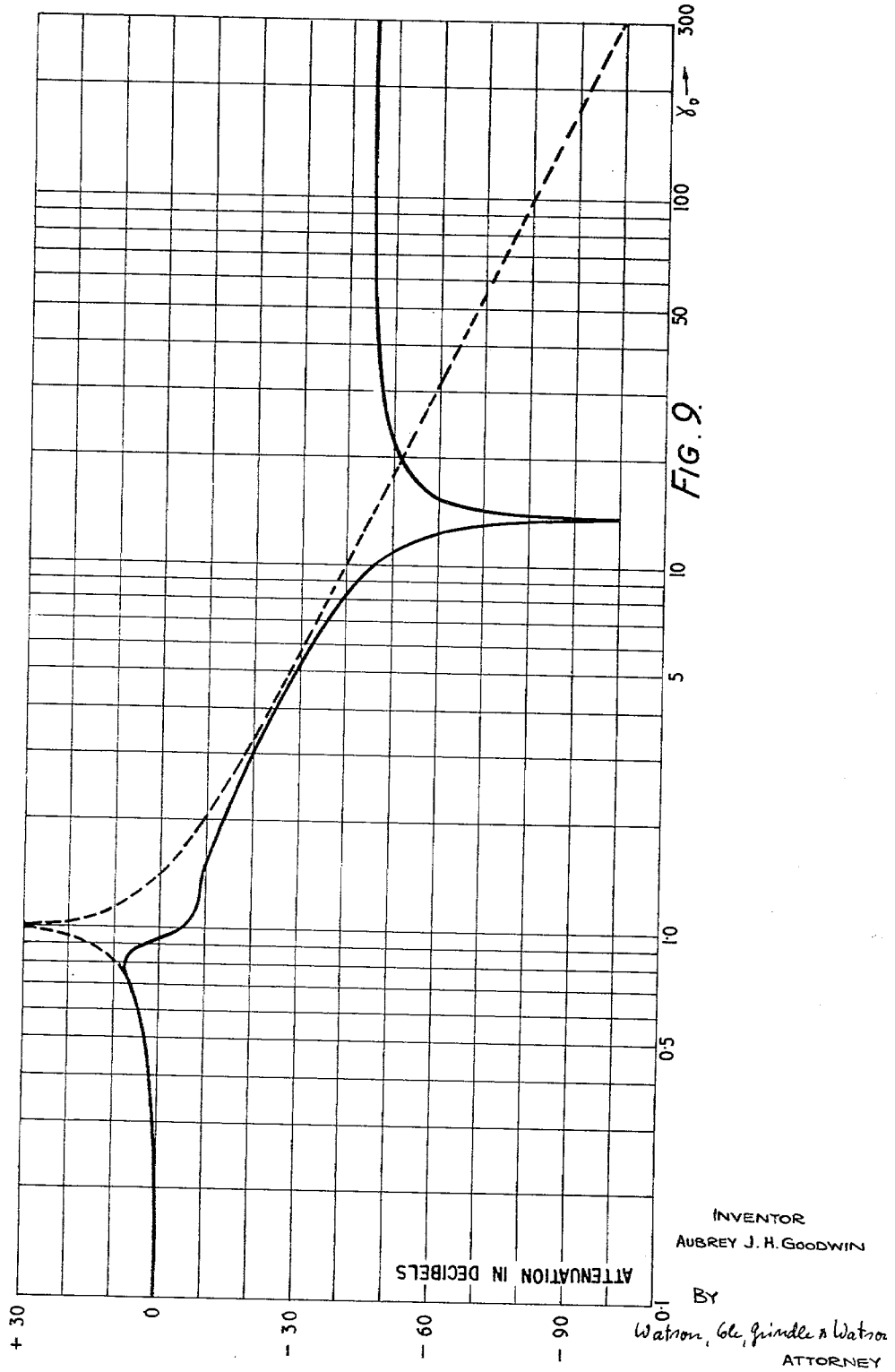
FIGURES 9–12 are graphs comparing over a range of frequencies the attenuation given by vibration isolators of the types shown in FIGURES 6–8 with that given by simple conventional isolators of the same static stiffness.

The principle of operation of the two-vessel vibration isolator is the same as that of the single-vessel vibration isolator, but the presence of the additional duct and vessel enables the maximum amplification of the vibration isolator to be reduced. The attenuation and amplification provided by a vibration isolator of this type are represented by the full curve in FIGURE 9 of the drawings. The broken curve represents the attenuation provided by a simple conventional vibration isolator having the same static stiffness. A comparison of FIGURES 4 and 9 of the drawings shows that, as stated above, the maximum amplification of the two-vessel vibration isolator is greatly reduced as compared with the corresponding single-vessel vibration isolator.

The mathematical analysis of the two-vesel vibration isolator is similar to that given above for the single-vessel vibration isolator and may be summarised as follows:

Assuming that a fraction $r$ of the fluid in the bellows vibrates in the system including the first vessel 13a and the associated duct 14a, and that a fraction $(1-r)$ vibrates in the system including the second vessel 13b and the associated duct 14b, then, for the first system:

$$\frac{F_s}{F_0} = \sqrt{\frac{(1-\gamma_1^2)^2 + \frac{C_1^2}{m_1 K_1}\gamma_1^2}{\left(1-\gamma_1^2-\frac{\lambda_1}{r}\gamma_1^2\right)^2 + \frac{C_1^2}{m_1 K_1}\gamma_1^2}} \quad (16)$$

Similarly, for the second system:

$$\frac{F_s}{F_0} = \sqrt{\frac{(1-\gamma_2^2)^2 + \frac{C_2^2}{m_2 K_2}\gamma_2^2}{\left(1-\gamma_2^2-\frac{\lambda_2}{1-r}\gamma_2^2\right)^2 + \frac{C_2^2}{m_2 K_2}\gamma_2^2}} \quad (17)$$

The relationship between $r$ and $\omega$ is given by the equation:

$$\frac{r}{1-r} = \frac{K_2 - m_2\omega^2 + iC_2\omega}{K_1 - m_1\omega^2 + iC_1\omega} \quad (18)$$

Putting $$\gamma_1^2 = \frac{m_1\omega^2}{K_1}, \quad \lambda_1 = \frac{M}{m_1}, \quad \lambda_2 = \frac{M}{m_2}$$

and $$q_2 = \frac{K_2}{K_1}$$

and transforming gives:

$$\frac{r}{1-r} = \sqrt{\frac{\left(q_2 - \frac{\lambda_1}{\lambda_2}\gamma_1^2\right)^2 + \frac{C_2^2}{m_2 K_2}\frac{q_2\lambda_1}{\lambda_2}\gamma_1^2}{(1-\gamma_1^2)^2 + \frac{C_1^2}{m_1 K_1}\gamma_1^2}} \quad (19)$$

When $$\gamma_1^2 = 0$$

then $$\frac{r}{1-r} = q_2 \quad (20)$$

When $$\gamma_1^2 = \frac{q_2\lambda_2}{\lambda_1}$$

then $$\frac{r}{1-r} = \sqrt{\frac{C_2^2}{\left(\frac{1}{q_2}-\frac{\lambda_2}{\lambda_1}\right)^2 m_2 K_2 + C_1^2}} \quad (21)$$

and $\gamma_2^2 = 1$

Therefore, if $C_2$ is small, it follows from Equation 21 that $r \simeq 0$ when $\gamma_2^2 = 1$ Thus, for $\gamma_2^2 = 1$, Equation 17 reduces to:

$$\frac{F_s}{F_0} = \sqrt{\frac{\frac{C_2^2}{m_2 K_2}}{\lambda_2^2 + \frac{C_2^2}{m_2 K_2}}} \quad (22)$$

The attenuation at this frequency, when using a simple conventional vibration isolator of the same static stiffness can be shown to be approximately $$\frac{1}{\lambda_2}$$

when $\lambda_2$ is large. Therefore, if the fluid vibration isolator is to give at this frequency an attenuation $Y$ times greater than that provided by the simple conventional vibration isolator, it follows from Equation 22 that $$\frac{C_2^2}{m_2 K_2} = \frac{\lambda_2^2}{Y^2\lambda_2^2 - 1} \simeq \frac{1}{Y^2} \quad (23)$$

Substituting this value in Equation 19, squaring and considering the case in which $\lambda_2$ is large compared with $\lambda_1$, Y is not small, and $\gamma_1^2 \leq 1$, gives $$r = \frac{-q_2^2 \pm \sqrt{q_2^4 + q_2^2 \phi(\gamma_1^2)}}{\phi(\gamma_1^2)} \qquad (24)$$

Where $$\phi(\gamma_2^2) = (1-\gamma_1^2)^2 + \frac{C_1^2}{m_1 K_1}\gamma_1^2 - q_2^2$$

From this expression, values of $r$ may be found for values of $\gamma_1^2$ less than 1 and hence $$\frac{F_s}{F_0}$$

may be calculated. For example, let $q_2 = 0.1$

It follows from Equation 16 that $$\frac{F_s}{F_0}$$

tends to a maximum when $$1 - \gamma_1^2 - \frac{\lambda_1}{r}\gamma_1^2 = 0$$

In order that the attenuation provided by the system including the vessel 13a and the duct 14a shall be a maximum in the region of maximum amplifications of the complete system, $m_1$ is selected so that:

$$\frac{K_0}{M} = \frac{K_1}{m_1}$$

This gives $$\lambda_1 = \frac{q_2}{1+q_2}$$

It can be shown that maximum amplification occurs when $$\gamma_1^2 \approx 0.75$$

If the maximum permissible amplification is X, then $$X = \frac{F_s}{F_0}(\text{max.}) = \sqrt{\frac{(1-0.75)^2 + \frac{C_1^2}{m_1 K_1}0.75}{\frac{C_1^2}{m_1 K_1}0.75}}$$

from which, for $q_2 = 0.1$, it follows that $$\frac{C_1^2}{m_1 K_1} = \frac{0.0625}{(X^2 - 1)0.75} \qquad (25)$$

The procedure in designing a two-vessel vibration isolator for some particular application may be summarised as follows:

M, $A_0$ and $\Delta_0$ will be known.
Then $$K_1 = \frac{1+q_2}{q_2}K_0$$

and $K_2 = (1+q_2)K_0$

After deciding which fluids are to be used in the systems, the vessel capacities may be obtained from the relations $$V_1 = \frac{A_0^2 B_1}{K_1}$$

and $$V_2 = \frac{A_0^2 B_2}{K_2}$$

As explained above, $m_1$ is so selected that $$\frac{K_1}{m_1} = \frac{K_0}{M}$$

which gives $$m_1 = \frac{K_1 M}{K_0}$$

If $q_2 = 0.1$, then (as has been shown above), the maximum amplification occurs when $\gamma_1^2 \approx 0.75$ Therefore $f_x = \sqrt{\frac{0.75 K_1}{4\pi^2 m_1}}$ Having decided upon the maximum permissible amplification then the value for $$\frac{C_1^2}{m_1 K_1}$$

is fixed by Equation 25 provided that $q_2 = 0.1$, that is to say, $$\frac{C_1^2}{m_1 K_1} = \frac{0.0625}{(X^2 - 1)0.75}$$

Also, by substituting for $C_1$, $m_1$ and $K_1$, the following relation may be derived:

$$\frac{C_1^2}{m_1 K_1} = \frac{12\nu_1^2}{f_x^2 A_1^2}$$

Therefore, the required value of $A_1$ may now be found from the relation:

$$A_1^2 = \frac{12\nu_1^2}{f_x^2 \frac{C_1^2}{m_1 K_1}}$$

And the value of $L_1$ may be found from the relation:

$$L_1 = \frac{m_1 A_1}{A_0^2 \rho_1}$$

Also $$m_2 = \frac{K_2}{(2\pi f_y)^2}$$

and $$\frac{L_2}{A_2} = \frac{m_2}{A_0^2 \rho_2}$$

Thus, by assuming a value for $A_2$, it is possible to find $L_2$. Substituting for $C_2$, $m_2$ and $K_2$ in Equation 23 gives:

$$Y \approx \frac{A_2 f_y}{4\nu_2}$$

From this it is possible to see whether or not the assumed value of $A_2$ is suitable from the point of view of the optimum attenuation required.

The following example illustrates the application of a two-vessel vibration isolator to the mounting of a 6-cylinder 4-stroke diesel engine running at 1000 revolutions per minute. The weight to be supported by the vibration isolator is 1,000 pounds and it is required that the static deflection of the vibration isolator shall be 0.75 inch when the pressure in the bellows is 100 pounds per square inch gauge. It is also required that the best attenuation should occur at the firing frequency and that the maximum amplification should not be greater than 6 decibels.

$A_0$ must be 10 square inches.
Assume that $q_2$ is to be 0.1.

Water is used in the system consisting of the bellows 12, vessel 13a and duct 14a, and air is used in the vessel 13b and duct 14b.

For the water at a pressure of 100 pounds per square inch gauge and a temperature of 80° F.:

$B_1 = 3.0 \times 10^5$ pounds per square inch
$\rho_1 = 0.036$ pound per cubic inch
$\nu_1 = 0.00133$ square inch per second
Therefore $V_1 = 1.18$ cubic feet
and $f_x = 3.128$ cycles per second.

The maximum permissible amplification is 6 decibels and therefore $X = 1.995$
Hence $A_1 = 0.00881$ square inch,
and $L_1 = 26.919$ inches.

For air at a pressure of 100 pounds per square inch gauge and a temperature of 80° F.:
$\rho_2 = 0.0003318$ pound per cubic inch
and $\nu_2 = 0.00312$ square inch per second
therefore $V_2 = 7.823$ cubic inches
Now $f_y = 50$ cycles per second
therefore $m_2 = 5.739$ pounds.

and $L_2 = 173$ reciprocal inches
$A_2$

Try $A_2 = 0.05$ square inch.
Then $L_2 = 8.65$ inches.
Therefore $Y \simeq 200.3 \simeq 46.03$ decibels.

$$\frac{F_s}{F_0} = \sqrt{\left(\frac{(1-\gamma_1^2)^2 + \frac{C_1^2}{M_1 K_1}\gamma_1^2}{\left[(1-\gamma_1^2)\left(1-\frac{\lambda_1}{q_R}\gamma_1^2\right) - \lambda_1\gamma_1^2\right]^2 + \frac{C_1^2}{m_1 K_1}\gamma_1^2\left(1-\frac{\lambda_1\gamma_1^2}{q_R}\right)^2}\right)} \quad (26)$$

That is, the attenuation at a frequency of 50 cycles per second is about 46.04 decibels beyond that achieved by a simple conventional vibration isolator having the same static stiffness.

Referring again to FIG. 9 of the drawings, the full curve represents the attenuation provided by the vibration isolator of the above example. The curve also represents, however, the attenuation provided by any two-vessel vibration isolator for which $K_1 = 10 K_2$ $\frac{K_1}{m_1} = \frac{386.4}{\Delta_0 \text{ inches}}$ and $\frac{C_1^2}{m_1 K_1} = 0.028$ $\frac{K_2}{m_2} = \frac{74065}{\Delta_0 \text{ inches}}$ and $\frac{C_2^2}{m_2 K_2} = 0.000024$ The frequency of the applied periodic force is related to $\gamma_0$ by the following general formula:

frequency of the applied periodic force
$= \frac{3.129\gamma_0}{\sqrt{\Delta_0 \text{ inches}}}$ cycles per second.

Figure 7:
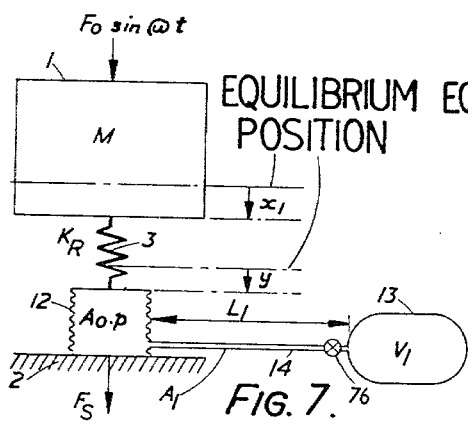

Referring to FIG. 7 of the drawings, a periodic force applied to a body 1 is isolated from a support 2 by a simple conventional vibration isolator and a single-vessel fluid vibration isolator.

The simple conventional vibration isolator is in the form of a spring 3 and the fluid vibration isolator consists of a flexible bellows 12, a vessel 13 and an interconnecting duct 14.

The fluid vibration isolator in this system may be designed to fulfill either of two functions. It may be designed to provide the best possible control of the amplification that occurs at the resonance frequencies of the system or it may be designed to give the best possible attenuation at one particular frequency.

Figure 10:
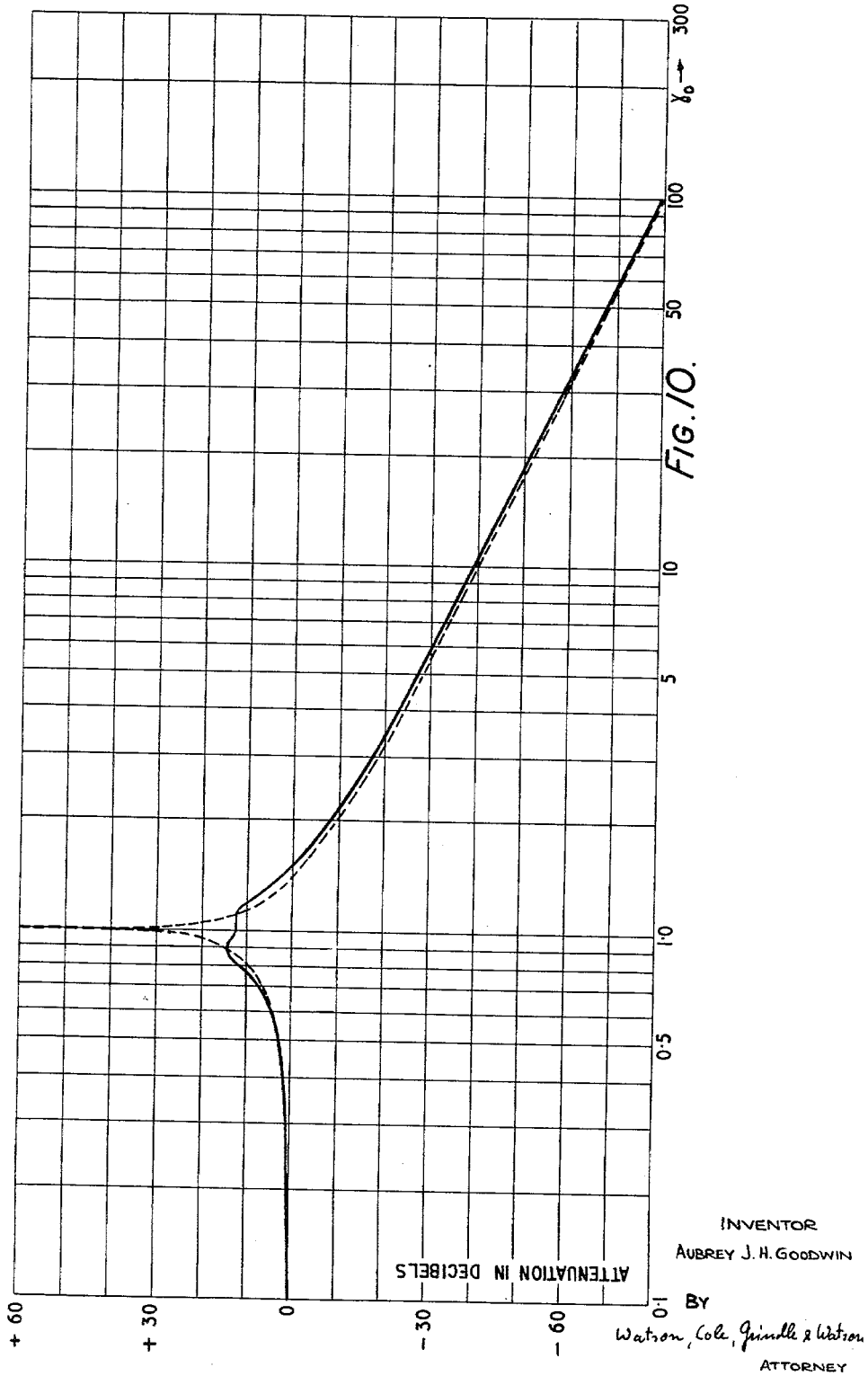

Referring to FIG. 10 of the drawings, the full curve represents the attenuation provided by a combined system of this type when the fluid vibration isolator is designed to provide the best possible control of the amplification that occurs at the resonance frequencies of the system. The broken curve represents the attenuation provided by a simple conventional vibration isolator having the same static stiffness. It will be seen that the two curves follow one another closely except in the region of resonance. The simple conventional vibration isolator gives a large amplification at a single frequency, whereas the combined system has two resonance frequencies at each of which the amplification is very much smaller than that given by the simple conventional vibration isolator.

Figure 11:
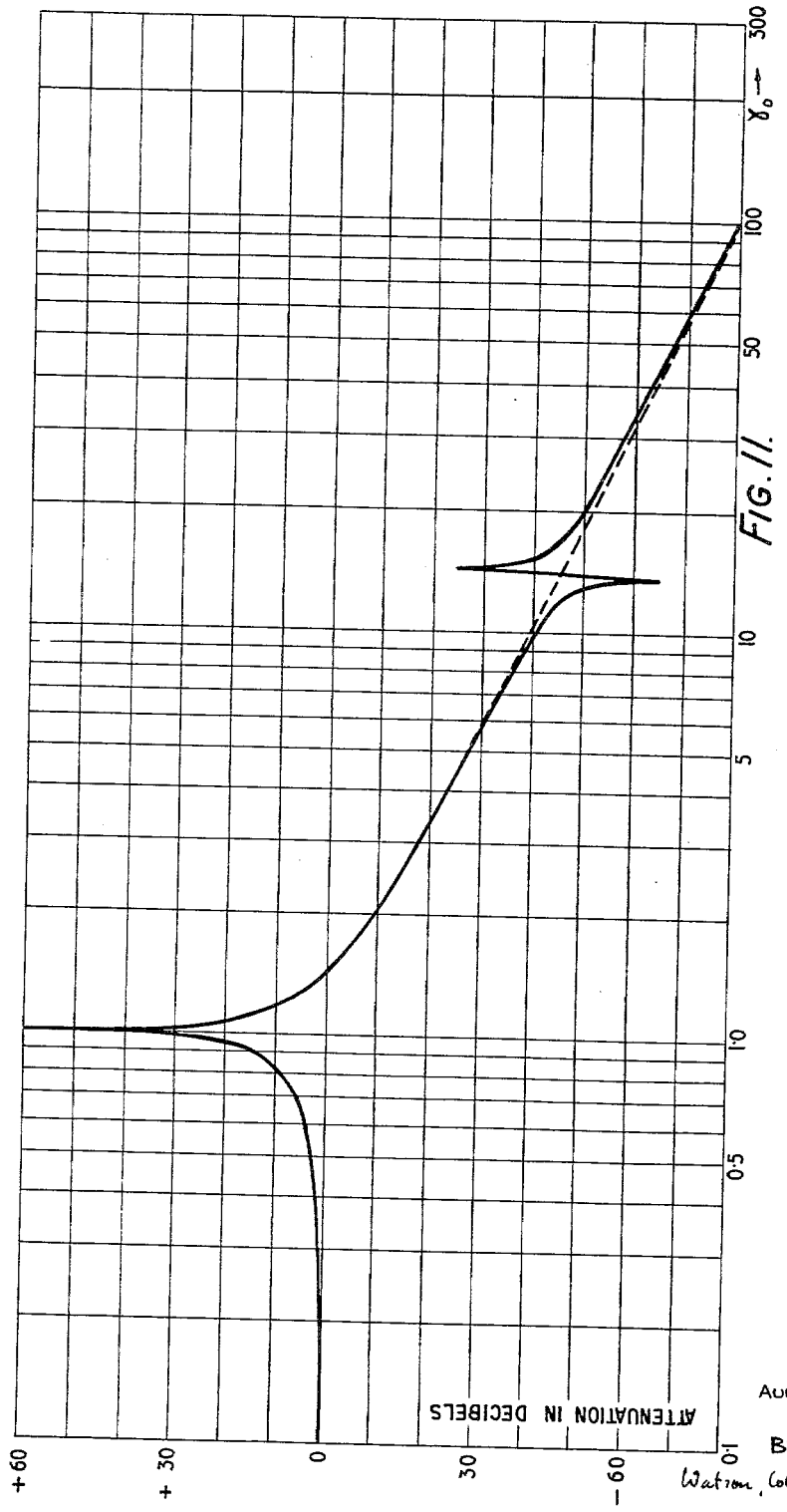

Referring to FIG. 11 of the drawings, the full curve represents the attenuation provided by the system when the fluid vibration isolator is designed to provide the best possible attenuation at one particular frequency. The broken curve represents the attenuation provided by a simple conventional vibration isolator having the same static stiffness. It will be seen that the two curves follow one another closely except that the system incorporating the fluid vibration isolator has an additional resonance frequency (which is above the resonance frequency of the simple conventional vibration isolator) and also a frequency (which is only a little lower than the higher of the two resonance frequencies of the system) at which very good attenuation is provided.

The methematical analysis of this system may be summarized as follows:

In order that the attenuation provided by the fluid vibration isolator shall be a maximum in the region in which the simple conventional vibration isolator gives maximum amplification, $k_1/m_1$ is selected so that $$\frac{K_1}{m_1} = \frac{K_R}{M}$$

This gives $\lambda_1 = q_R$.
Substituting for $\lambda_1$ in Equation 26 gives:

$$\frac{F_s}{F_0} = \pm \left[\frac{(1-\gamma_1^2)^2 + \frac{C_1^2}{m_1 K_1}\gamma_1^2}{[(1-\gamma_1^2)^2 - q_R\gamma_1^2]^2 + \frac{C_1^2}{m_1 K_1}\gamma_1^2(1-\gamma_1^2)^2}\right]^{1/2} \quad (27)$$

When the damping is zero (that is to say, when
$$\frac{C_1^2}{m_1 K_1} = 0)$$
then Equation 27 reduces to:

$$\frac{F_s}{F_0} = \pm \frac{1-\gamma_1^2}{(1-\gamma_1^2)^2 - q_R\gamma_1^2} \quad (28)$$

When the damping is infinite (that is to say, when
$$\frac{C_1^2}{m_1 K_1} = \infty)$$
the Equation 27 reduces to:

$$\frac{F_s}{F_0} = \pm \frac{1}{1-\gamma_1^2} \quad (29)$$

The curves that can be plotted from Equations 28 and 29 show the limits of the amplification and attenuation provided by the system for any particular value of $\gamma_1$ and, because these curves intersect at two points, it follows that, whatever the degree of damping, the curve showing the actual amplification and attenuation provided by such a system having an intermediate degree of damping must also pass through these points. The values of $\gamma_1$ corresponding to these points may be found from Equations 28 and 29, but it must be remembered that, in order to allow for the phase relationship, the plus sign must be taken in one case and the minus sign in the other.
Thus $$\frac{-1}{1-\gamma_1^2} = \frac{1-\gamma_1^2}{(1-\gamma_1^2)^2 - q_R\gamma_1^2} \quad (30)$$

Whence $$\gamma_1^2 = \frac{4 + q_R \pm \sqrt{8q_R + q_R^2}}{4} \quad (31)$$

It is clear from Equation 29 that $F_s/F_0$ is greater for the smaller value of $\gamma_1^2$, that is to say, when $$\gamma_1^2 = \frac{4 + q_R - \sqrt{8q_R + q_R^2}}{4}$$

and it follows that the best control of amplification at resonance will be achieved if the damping coefficient is so chosen that the amplification curve passes through its maximum at this value.

This implies that the derivative at this value must be zero. That is:

$$\frac{d}{d\gamma_1}\left[\frac{(1-\gamma_1^2)^2+\frac{C_1^2}{m_1K_1}\gamma_1^2}{[(1-\gamma_1^2)^2-q_R\gamma_1^2]^2+\frac{C_1^2}{m_1K_1}\gamma_1^2(1-\gamma_1^2)^2}\right]^{1/2}=0 \quad (32)$$

The optimum value of the damping coefficient $C_1^2/m_1K_1$ may be found for any specific value of $q_R$ by solving Equation 32 for $$\gamma_1=\sqrt{\frac{4+q_R\sqrt{8q_R+q_R^2}}{4}}$$

The curve relating the optimum value of $C_1^2/m_1K_1$ to the value of $q_R$ shown in FIGURE 13 has been derived on this basis. FIGURE 14 shows the corresponding maximum value of $F_s/F_0$ as calculated from Equation 29.

If the system is being designed to give the best attenuation at a particular frequency, then the value of $F_s/F_0$ tends to a minimum when $\gamma_1^2=1$. Therefore $$\frac{F_s}{F_0}(\min.)=\sqrt{\frac{\frac{C_1^2}{m_1K_1}}{\lambda_1^2+\frac{C_1^2}{m_1K_1}\left(1-\frac{\lambda_1}{q_R}\right)^2}} \quad (33)$$

If the combined system were to be replaced by a simple conventional vibration isolator of which the static stiffness was equal to that of the combined system, then it can be shown that the attenuation at this frequency would be approximately $$\frac{q_R}{\lambda_1(1+q_R)}$$

when $\lambda_1$ is large.

If the combined system is to give at this frequency an attenuation Y times greater than the equivalent simple conventional vibration isolator, then it follows from Equation 33 that $$\frac{\frac{C_1^2}{m_1K_1}}{\lambda_1^2+\frac{C_1^2}{m_1K_1}\cdot\frac{\lambda_1^2}{q_R^2}}\simeq\frac{q_R^2}{\lambda_1^2(1+q_R)^2Y^2} \quad (34)$$

If Y is much greater than 1, this gives $$\frac{C_1^2}{m_1K_1}\simeq\frac{q_R^2}{Y^2(1+q_R)^2} \quad (35)$$

The procedure for designing a system of this type may be summarised as follows: M, $A_0$ and $\Delta_0$ will be known and $$K_1=K_0\frac{(1+q_R)}{q_R}$$

and $$K_R=K_0(1+q_R)$$

Hence $K_1$ and $K_R$ may be found by assuming a value for $q_R$

By definition, $$V_1=\frac{A_0^2B_1}{K_1}$$

for a fluid.
For a gas, this becomes $$V_1=\frac{A_0^2np}{K_1}$$

After the fluid to be used has been selected, a value for $V_1$ may be obtained.

If the system is being designed to give best control of amplification at resonance, then $$\frac{K_1}{m_1}=\frac{K_R}{M}$$

From which $$m_1=\frac{K_1M}{K_R}=\frac{M}{q_R}$$

Also, by definition, $$m_1=\frac{A_0^2\rho_1L_1}{A_1}$$

Hence $$\frac{L_1}{A_1}=\frac{M_2}{q_RA_0\rho_1}$$

Using this expression and the defined value of $C_1$, the following expression may be derived:

$$\frac{C_1^2}{m_1K_1}=\frac{(8\pi\nu_1)_2\Delta_0}{A_1^2(1+q_R)g}$$

The selected value of $$\frac{C_1^2}{m_1K_1}$$

will be that value which is given by FIG. 13 for the selected value of $q_R$. Thus $A_1$ may be found from the equation:

$$A_1^2=\frac{(8\pi\nu_1)^2\Delta_0}{\frac{C_1^2}{m_1K_1}(1+q_R)g}$$

The corresponding value of $L_1$ may then be found from the expression for $$\frac{L_1}{A_1}$$

given above. If the system is being designed to give the best posible attenuation at a particular $f_y$, then $$m_1=\frac{K_1}{(2\pi f_y)}$$

From Equation 35 and by substituting for $C_1, m_1,$ and $K_1$, the following relationship may be obtained:

$$\frac{q_R^2}{Y^2(1+q_R)^2}\simeq\frac{16\nu_1^2}{A_1^2fy^2}$$

which may be rewritten as $$Y\simeq\frac{q_RA_1fy}{(1+q_R)4\nu_1}$$

When the additional attenuation required (Y) has been selected, the appropriate value of $A_1$ may be found from the above equation. Using this value, $L_1$ may then be found from the following relation:

$$L_1=\frac{m_1A^1}{A_0^2\rho_1}$$

The following example illustrates the application of such a system to the mounting of a 6-cylinder 4-stroke diesel engine, the system being designed to support a weight of 1,000 pounds and so that the static deflection under this load is 0.75 inch when the pressure in the bellows is 100 pounds per square inch gauge. The system is also designed to provide the minimum amplification at resonance.

Assume that $q_R=0.1$. Water is used as the fluid in the fluid vibration isolator. A water temperature of 80° F.

is assumed. For $q_R=0.1$, it can be seen from FIG. 13 that the optimum value of $$\frac{C_1^2}{m_1 K_1}$$

is 0.175. Therefore $$\frac{L_1}{A_1} = \frac{M}{q_R A_0^2 \rho_1}$$

$$= 2777.7$$

Also $$A_1^2 = \frac{(8\pi\nu_1)^2 \Delta_0}{\frac{C_1^2}{m_1 K_1}(1+q_R)}$$

$$= 0.000011266173 \text{ inch}^4$$

Hence $A_1 = 0.003565$ square inch
and therefore $L_1 = 9.903$ inches.

Also, $A_0 = 10$ square inches,
$K_R = 1,466$ pounds per inch,
$V_1 = 1.18$ cubic feet.

The attenuation and amplification provided by this particular system is shown by the full curve in FIG. 10 of the drawings, but that curve also represents the attenuation and amplification of any such system for which:

$$K_1 = 10 K_R$$

$$\frac{K_1}{m_1} = \frac{425.04}{\Delta_0 \text{ inches}}$$

and $$\frac{C_1^2}{m_1 K_1} = 0.175$$

The next example illustrates the application of such a system to the mounting of the same diesel engine, but in this case the system is designed so that the static deflection is 0.75 inch when the pressure in the bellows is 25 pounds per square inch gauge and so that the system provides an additional attenuation of 20 decibels (as compared with the attenuation provided by a simple conventional vibration isolator) at the firing frequency of the engine (the engine speed being 1,000 revolutions per minute).

Assume that $q_R = 0.1$.

Air if used in the vessel 13 and duct 14, and water is used in the bellows 12. The pressure in the bellows is 25 pounds per square inch gauge and the temperature of the air in the vessel 13 and the duct 14 is assumed to be 80° F.

Then making $A_0 = 40$ square inches,
$K_R = 1,466$ pounds per inch,
$V_1 = 4,331$ cubic inches,
$A_1 = 0.079376$ square inch, and
$L_1 = 24.81$ inches gives $f_y = 50$ and $Y = 20$ decibels as required.

The actual attenuation and amplification provided by this system is represented by the full curve in FIG. 11, but that curve also represents the attenuation and amplification provided by any such system for which:

$$K_1 = 10 K_R$$

$$\frac{K_1}{m_1} = \frac{74065}{\Delta_0 \text{ inches}}$$

and $$\frac{C_1^2}{m_1 K_1} = 0.000083$$

The frequency of the applied periodic force is related to $\gamma_0$ by the following general formula (which applies to both FIGURES 10 and 11).

frequency of the applied periodic force $$= \frac{3.129 \gamma_0}{\sqrt{\Delta_0 \text{ inches}}} \text{ cycles per second}$$

Figure 8:
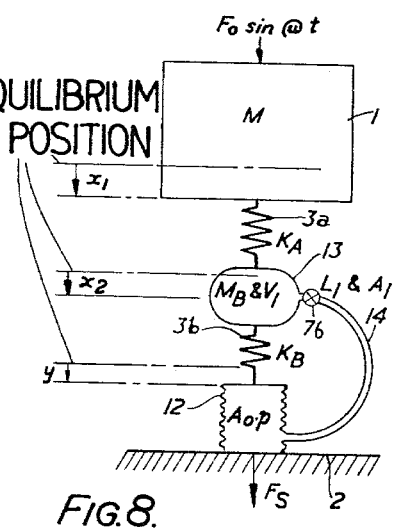

Referring to FIG. 8 of the drawings, a periodic force applied to a body 1 is isolated from a support 2 by a conventional two-mass vibration isolator and a single-vessel fluid vibration isolator.

The fluid vibration isolator consists of a flexible bellows 12, a vessel 13 and an interconnecting flexible duct 14. The conventional two-mass vibration isolator consists of springs 3a and 3b and an intermediate mass in the form of the vessel 13 and its contents. The vessel 13 and its contents thus serve a dual purpose, for they act both as the resilient means for the fluid vibration isolator and as the intermediate mass of the conventional two-mass vibration isolator.

The mathematical analysis of this system may be summarised as follows:

$$\frac{F_s}{F_0} = \frac{1 - \frac{m_1 \omega^2}{K_1} + \frac{iC_1\omega}{K_1}}{\left(1 + \frac{K_B}{K_1} - \frac{m_1 \omega^2}{K_1} + \frac{iC_1\omega}{K_1}\right)\left[\left(\frac{K_A}{K_B} + 1 - \frac{M_B \omega^2}{K_B}\right)\left(1 - \frac{M\omega^2}{K_A}\right) - \frac{K_A}{K_B}\right] - \frac{K_B}{K_1}\left(1 - \frac{M\omega^2}{K_A}\right)} \quad (36)$$

Thus $$\frac{F_s}{F_0} = \left[\frac{(1-\gamma_1^2)^2 + \frac{C_1^2}{m_1 K_1}\gamma_1^2}{\left[(1-\gamma_1^2)\left(1-\gamma^2+\frac{\gamma^4}{N}\right) - q_B\gamma^2\left(1 - \frac{S}{1+\lambda_B-1+S}\right) + \frac{q_B\gamma^4}{N}\right]^2 + \frac{C_1^2}{m_1 K_1}\gamma_1^2\left(1-\gamma^2+\frac{\gamma^4}{N}\right)^2}\right]^{1/2} \quad (37)$$

where $$N = \lambda_B S \left[\frac{\lambda_B(1+S)+1}{\lambda_B S}\right]^2$$

If the static stiffness of the fluid vibration isolator is infinite (which is equivalent to removing the fluid vibration isolator from the system) or if the value of $C_1$ becomes infinite, then Equation 37 reduces to $$\frac{F_s}{F_0} = \frac{1}{1-\gamma^2+\frac{\gamma^4}{N}} \quad (38)$$

This is the attenuation provided by a conventional two-mass vibration isolator and it can be shown that the system has two resonance frequencies of which the higher occurs at $\gamma^2 \simeq N-1$. It can also be shown that, for any chosen value of $\lambda_B$, the optimum result is obtained if the following relationship is satisfied:

$$S = 1 + \frac{1}{\lambda_B}$$

Using this relationship, N becomes equal to $4(\lambda_B+1)$ and thus the higher resonance frequency occurs at $\gamma^2 \simeq 4\lambda_B+3$. Curves for these optimum conditions with the various values of $\lambda_B$ are shown in FIG. 2 and have already been described. Putting $N=4(\lambda_B+1)$ in Equation 37 gives:

$$\frac{F_s}{F_0}=\left[\frac{(1\gamma_1{}^2)^2+\frac{C_1{}^2}{m_1K_1}\gamma_1{}^2}{\left[(1-\gamma_1{}^2)\gamma\left(1-\gamma^2+\frac{\gamma^4}{4(\lambda_B+1)}\right)-\frac{q_B\gamma^2}{2}+\frac{q_B\gamma^4}{4(\lambda_B+1)}\right]^2+\frac{C_1{}^2}{m_1K_1}\gamma_1{}^2\left(1-\gamma^2+\frac{\gamma^4}{4(\lambda_B+1)}\right)^2}\right]^{1/2} \quad (39)$$

The best control of amplification at the higher resonance frequency is achieved if $$\frac{K_1}{m_1}$$

is selected so that $\gamma_1{}^2=1$, in which case $\gamma^2 \simeq 4\lambda_B+3$.

The procedure for designing a system of this type may be summarised as follows:

$M$, $A_0$, $\Delta_0$ and $\lambda_B$ will be known and $$\Delta_0=\frac{Mg}{K_0}=\frac{Mg}{K_A}+\frac{Mg+M_Bg}{K_B}+\frac{Mg+M_Bg}{K_1}$$

Also, $$\frac{K_B}{K_A}=S=1+\frac{1}{\lambda_B} \text{ and } \frac{K_B}{K_1}=q_B$$

Therefore $$K_A=K_0(2+q_B)$$

$$K_B=K_0(2+q_B)\left(1+\frac{1}{\lambda_B}\right)$$

$$K_1=K_0\left(\frac{2+q_B}{q_B}\right)\left(1+\frac{1}{\lambda_B}\right)$$

Hence $K_A$, $K_B$ and $K_1$ may be found by assuming a value for $q_B$.

By definition $$V_1=\frac{A_0{}^2B_1}{K_1}$$

for a fluid
or $$V_1=\frac{A_0{}^2np}{K_1}$$

for a gas.

After the fluid to be used has been selected, a value for $V_1$ may be obtained.

Since for best control of amplification $\gamma_1{}^2=1$, so that $$\gamma^2 \simeq 4\gamma_B+3$$

and $$\gamma^2=\omega^2\frac{2M}{K_B}\left[1+\frac{1}{\lambda_B}\right]$$

it follows that $$\frac{K_1}{m_1}=\omega^2=\frac{K_B(4\lambda_B+3)}{2M\left(1+\frac{1}{\lambda_B}\right)}$$

Therefore $$m_1=\frac{2K_1M\left(1+\frac{1}{\lambda_B}\right)}{K_B(4\lambda_B+3)}$$

Thus the value of $m_1$ may be calculated.

Also $$K_1=\frac{A_0{}^2\rho_1L_1K_0(4\lambda_B+3)(2+q_B)}{2MA_1}$$

Using this value for $K_1$ and the defined values for $C_1$ and $m_1$, the following expression may be derived:

$$\frac{C_1{}^2}{m_1K_1}=\left[\frac{8\pi\nu_1}{A_1}\right]^2\cdot\frac{2M}{K_0(4\lambda_B+3)(2+q_B)}$$

By assuming a value for $$\frac{C_1{}^2}{m_1K_1}$$

(which value should lie between 0.1 and 0.5), the required value of $A_1$ may be obtained. Using this, the value of $L_1$ is deduced from the expression $$L_1=\frac{m_1A_1}{A_0{}^2\rho_1}$$

The following example illustrates the application of such a system to the mounting of a 6-cylinder 4-stroke diesel engine, the system being designed to support a weight of 1,000 pounds and so that the static deflection under this load is 0.75 inch when the pressure in the bellows is 200 pounds per square inch gauge. The system is also designed so as to provide best control of the amplification in the region of the higher resonance frequency range. $\lambda_B$ is to be 50 and $q_B$ is to be 0.2.

The fluid used in the fluid vibration isolator is an oil for which, at a pressure of 200 pounds per square inch gauge and a temperature of 80° F., the average values of $B_1$, $\rho_1$ and $\nu_1$ are as follows:

$B_1=2.1\times10^5$ pounds per square inch,
$\rho_1=0.0323$ pound per cubic inch,
and
$\nu_1=0.8865$ square inch per second.

For best control of amplification with $\lambda_B=50$ and $q_B=0.2$, it can be found that $$\frac{C_1{}^2}{m_1K_1}$$

should be within the range of from 0.1 to 0.5.
Take $$\frac{C_1{}^2}{m_1K_1}=0.2$$

This gives:

$A_0=5$ square inches,
$K_B=2{,}991$ pounds per inch,
$V_1=351$ cubic inches,
$A_1=0.1469$ square inch,
and
$L_1=9.141$ inches.

Figure 12:
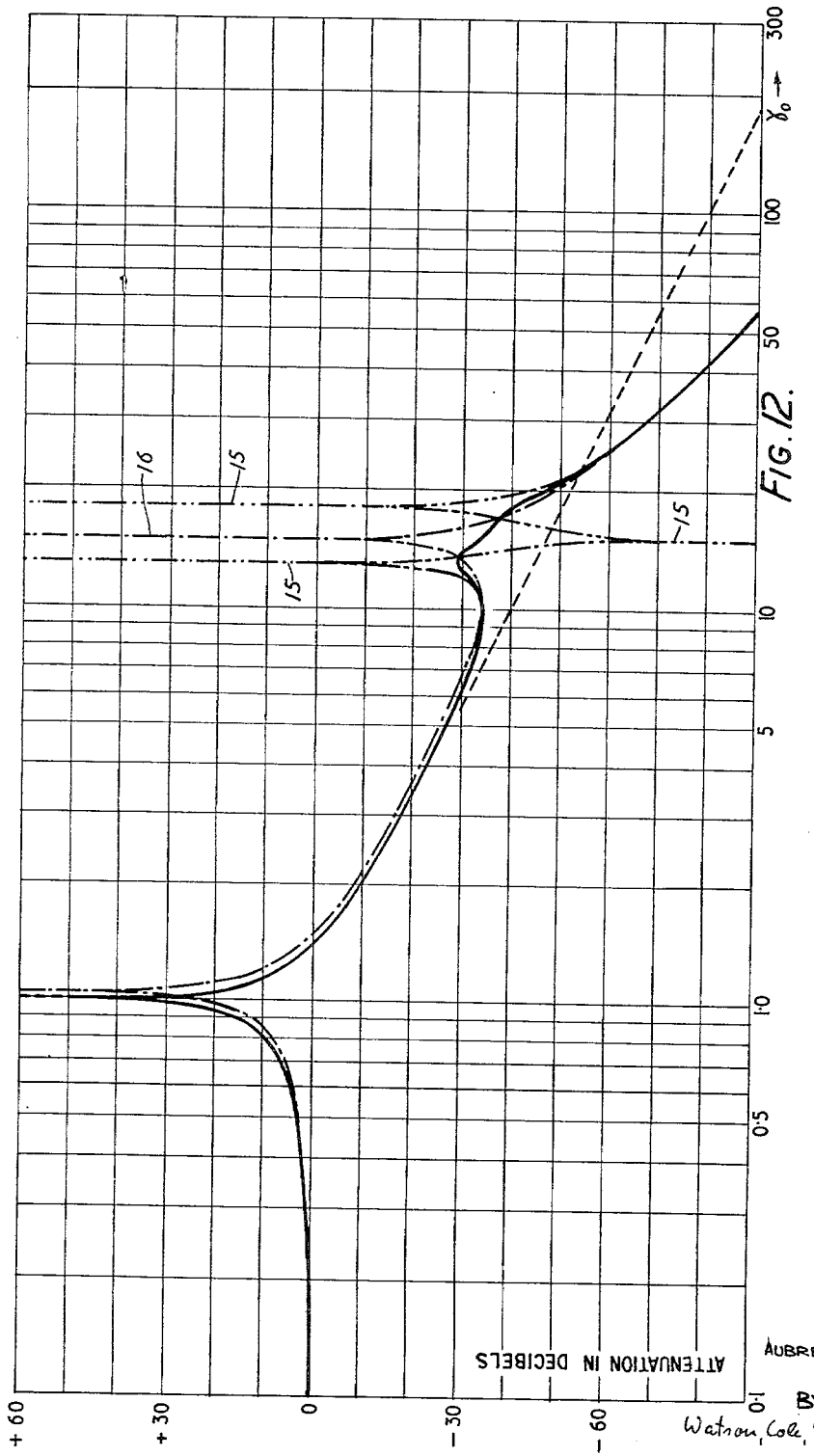

The amplification and attenuation provided by this system is represented by the full curve in FIG. 12 of the drawings, which also represents the amplification and attenuation provided by any such system for which:

$\lambda_B=50$,
$K_1=5\,K_B$,
$K_B=1.02\,K_A$, $$\frac{K_1}{m_1}=\frac{86283}{A_0} \text{ inches}$$

and $$\frac{C_1{}^2}{m_1K_1}=0.2$$

The dotted curve represents the amplification and attenuation provided by a simple conventional vibration isolator having the same static stiffness. The chaindotted curves 15 and 16 represent the amplification and attenuation provided by systems as shown in FIG. 8 in which the value of $C_1^2/m_1K_1=0$ and $\infty$ respectively. Thus the curve 15 applies to a system having no damping and curve 16 applies to a system having infinite damping.

The frequency of the applied periodic force is related to $\gamma_0$ by the following general formula:

frequency of the applied periodic force $$= \frac{3.129\gamma_0}{\sqrt{\Delta_0 \text{ inches}}} \text{ cycles per second}$$

It will be seen that curve 15 shows very good attenuation at one particular frequency, but that this is accompanied by considerable amplification at the two adjacent resonance frequencies. Values of $$\frac{C_1^2}{m_1K_1}$$

between 0.1 and 0.5 all give fairly good control of the amplification at resonance for values of $\gamma_0$ lying between 13 and 18.

In any of the vibration isolators shown in FIGURES 3, 6, 7, and 8 of the drawings, the bellows 12 may be replaced by the plunger-and-barrel assembly shown in FIGURE 5 of the drawings.

The assembly comprises a hollow rigid plunger indicated generally by the reference numeral 33 and a flexible barrel, indicated generally by the reference numeral 34.

The upper and lower parts, 35 and 36 respectively, of the plunger side wall are each cylindrical in shape and the middle part 37 is of frusto-conical form tapering upwardly so that the diameter of the upper cylindrical part 35 is less than that of the lower part 36. At its lower edge, the lower cylindrical part 36 is welded to the upper surface of a circular base plate 38, which can be secured to the support 2 by, for example, bolts 39. At the upper end of the upper part 35 of the plunger side wall, there is an inwardly extending annular flange 40 of which the inner part is of increased thickness and forms an annular boss 41, which is internally screw-threaded to receive a plug 42. Extending outwardly from the upper end of the plug 42 is an annular flange 43 of which the outer diameter is greater than the outer diameter of the boss 41.

The side and bottom walls of the barrel 34 are formed by a single member, which is of generally tubular form and is made of rubber or other suitable flexible material. The lower end portion 44 of this flexible member, which is of increased thickness and has embedded in it a metal reinforcing ring 45, is clamped between the annular flange 40 at the top of the plunger 33 and the annular flange on the plug 42.

From its lower end, the flexible member extends outwards over the upper surface of the annular flange 40 and turns downwards over the rounded edge formed where the upper part 35 of the plunger side wall meets the flange 40. The outer surface of the flexible member here makes a close fit around the upper cylindrical part 35 of the plunger side wall before the member turns outwardly and then upwardly to form the barrel side wall 46. At the upper end of the barrel side wall 46, the flexible member turns inwards and terminates in a thickened end portion 47 which contains a metal reinforcing ring 48.

Surrounding the side wall 46 of the barrel 34 is a reinforcing metal band 49, which serves to prevent any substantial changes in the effective horizontal cross-sectional area of the barrel 34. The band 49 is located axially with respect to the side wall 46 by means of a ridge 50, which is formed in the outer surface of the side wall 46 and engages an annular recess formed by a circumferentially extending bulge in the band 49.

The top end wall of the barrel 34 is formed by a circular metal disc 51, having a central circular aperture. At its periphery, the disc 51 has a flange 52 which extends downwardly to provide a generally cylindrical seating for the upper end portion 47 of the flexible barrel member and terminates in an outwardly extending portion. A circular plate 53 is secured on top of the disc 51 by means of a nut 54 and a bolt 55. The bolt 55 passes through the circular aperture in the disc 51 and through a registering aperture in the plate 53, and has an axial bore passing through it to provide communication between the interior of the barrel 34 and a tube 14, which is secured to the bolt 55 by a union nut 56. Apart from the end portion, the tube 14 is straight and extends horizontally.

The body 1 to which the periodic force is to be applied is secured to the plate 53 by a number of nuts 57 and bolts 58, which are arranged at intervals around the raised peripheral portion of the plate 53, and is spaced from the plate 53 by a number of sleeves 59, one on each bolt 58.

In operation, an increase in the downward force applied to the assembly by the body 1 causes the flexible member of the barrel 34 to roll down over the upper cylindrical part 35 of plunger 33 thereby decreasing the internal volume of the barrel 34. When the force decreases, the flexible member unrolls from the part 35 under the action of the pressure of the fluid within the assembly and the internal volume of the barrel 34 increases. The metal reinforcing band 49 bears a considerable part of the stress resulting from the pressure of the fluid within the barrel 34 and it is possible to arrange that the flexible member has very little stiffness so that, as is desired, substantially all the static stiffness of the assembly against axial compression derives from the pressure of the fluid within the barrel.

In the vibration isolators described above, the resilience of the vibration isolators is derived substantially entirely from the bulk elasticity of the fluid in the vessel or vessels (assuming that the elasticity of the vessel is negligible by comparison with that of the fluid it contains). If desired, however, additional resilience may be provided by incorporating in the vessel a resilient member such as, for example, a spring-loaded piston or diaphragm. In the case of a liquid-filled vessel additional resilience may be provided by having a small quantity of gas in the vessel. The gas may be either free or contained in a flexible and sealed bag.

In order to enable the degree of damping of any of the vibration isolators shown in FIGURES 3, 7 and 8 to be readily adjusted, an adjustable throttle valve 76 may be situated in the duct 14 adjacent to the vessel 13 to which the duct leads. In the case of the vibration isolator shown in FIGURE 6, an adjustable throttle valve 76 may be provided for each or only one of the ducts 14a and 14b. The degree of damping may then be increased or decreased by increasing or decreasing respectively the degree of throttling produced by the valve.

I claim:

1. A vibration isolator for isolating from a first body a periodic force applied to a second body while at the same time transmitting to the first body a constant force applied to the second body, which vibration isolator comprises a variable-volume fluid-filled container for interposition between the said two bodies, a first vessel containing a fluid, first conduit means of which the effective cross-sectional area is less than the effective cross-sectional area of the said container, which contains a body of fluid and which communicates with both the interior of the said container and the interior of the first vessel and provides the sole means of such communication, at least one additional vessel containing a fluid, additional conduit means of which the effective cross-sectional area is less than the effective cross-sectional area of the said container, which contains an additional body of fluid and which communicates with both the interior of the said container and the interior of the additional vessel and provides the sole means of such communication, the said container, vessels and conduit means together forming a closed system, and the mass of each of the said bodies of fluid, the dimensions of the conduit means containing that body of fluid, the apparent bulk modulus of the fluid in the vessel with the interior of which that conduit means communicates and the degree of damping applied to that body of liquid being such that, at a particular frequency of the periodic force, which is different for each of the said bodies of fluid, the inertia reaction of that mass substantially balances the force exerted on that body of fluid by the fluid in that vessel.

2. A vibration isolator as claimed in claim 1, wherein there is provided a single additional conduit means containing an additional body of fluid and an associated vessel containing a fluid, wherein the square of the damping effects of the fluids in said vessels and said conduits referred to said containers are related to the product of the virtual mass of the fluid in said vessels and said conduits respectively and the static stiffness of said vessels and said conduits with the value for the first vessel within the range of from 0.01 to 0.1 and the value for the additional vessel being not greater than 0.0001.

3. A vibration isolator for isolating from a first body a periodic force applied to a second body while at the same time transmitting to the first body a constant force applied to the second body, which vibration isolator comprises resilient means, a variable-volume fluid-filled container arranged in series with the resilient means for interposition together between the said two bodies, a vessel containing a fluid, conduit means of which the cross-sectional area is less than the effective cross-sectional area of the said container, which contains a body of fluid and which communicates with both the interior of the said container and the interior of the said vessel and provides the sole means of such communication, the said container, vessel and conduit means together forming a closed system, and the mass of the said body vessel and provides the sole means of such communication, the said container, vessel and conduit means together forming a closed system, and the mass of the said body of fluid in the conduit means, the dimensions of the conduit means, the apparent bulk modulus of the fluid in the said vessel and the degree of damping being such that, at a particular frequency of the periodic force, the inertia reaction of the said mass substantially balances the force exerted on the said body of fluid by the fluid in the said vessel.

4. A vibration isolator for isolating from a first body a periodic force applied to a second body while at the same time transmitting to the first body a constant force applied to the second body, which vibration isolator comprises first resilient means, second resilient means, a massive body interposed between the first and second resilient means, a variable-volume fluid-filled container connected to an end of one of the resilient means remote from the said massive body and arranged for interposition, in series with the first and second resilient means and the said massive body, between the first and second bodies, a vessel containing a fluid, conduit means of which the cross-sectional area is less than the effective cross-sectional area of the said container, which contains a body of fluid and which communicates with both the interior of the said container and the interior of the said vessel and provides the sole means of such communication, the said container, vessel and conduit means together forming a closed system, and the mass of the said body of fluid in the conduit means, the dimensions of the conduit means, the apparent bulk modulus of the fluid in the said vessel and the degree of damping being such that, at a particular frequency of the periodic force, the inertia reaction of the said mass substantially balances the force exerted on the said body of fluid by the fluid in the said vessel.

5. A vibration isolator as claimed in claim 4, wherein the said vessel and the fluid contained in the vessel together constitute the said massive body, and the square of the damping effects of the fluids in said vessel and said conduit referred to said container is within the range of 0.05 to 0.5 of the product of the virtual mass of the fluid in said vessel and said conduit and the static stiffness of said vessel and said conduit.

6. A system comprising a mechanism which itself has a natural frequency of vibration, a support for the mechanism, a variable-volume fluid-filled container interposed between the support and the mechanism for isolating from the support a periodic force arising from the operation of the mechanism, a vessel containing a fluid, conduit means of which the effective cross-sectional area is less than the effective cross-sectional area of the said container, which contains a body of fluid and which communicates with both the interior of the said container and the interior of the said vessel and provides the sole means of such communication, the said container, vessel and conduit means together forming a closed system, and the mass of the said body of fluid in the conduit means, the dimensions of the conduit means and the apparent bulk modulus of the fluid in the said vessel being such and the square of the damping effects of the fluids in said vessel and said conduit referred to said container is within the range of 0.1 to 0.25 of the product of the virtual mass of fluid in said vessel and said conduit and the static stiffness of said vessel and said conduit so that, at the said natural frequency, a substantial degree of attenuation is provided.

7. A system as claimed in claim 6, wherein the said mechanism and the arrangement of the variable-volume container and the support are such that the period force is a centrifugal force arising from the rotation of a part of the mechanism.

8. A vibration isolator for isolating from a first body a periodic force applied to a second body while at the same time transmitting to the first body a constant force applied to the second body, which vibration isolator comprises a variable-volume fluid-filled container for interposition between the said two bodies, a vessel containing a fluid, which provides substantially the whole of the static stiffness of the vibration isolator, conduit means of which the effective cross-sectional area is less than the effective cross-sectional area of the said container, which contains a body of fluid and which communicates with both the interior of the said container and the interior of the said vessel and provides the sole means of such communication, wherein relative movement between the two said bodies in the said one sense causes fluid to flow in the conduit means towards the vessel against the pressure of the fluid in the vessel and relative movement between the said bodies in the opposite sense causes fluid to flow in said conduit means towards the variable-volume container under the action of the pressure of the fluid in the vessel, wherein the variable-volume container comprises a flexible bellows, wherein the effective cross-sectional area of the variable-volume fluid-filled container exceeds the effective cross-sectional area of the conduit means by a factor of at least 10, wherein the fluid in the said vessel is a liquid and there is provided in the vessel a body of gas, and wherein there is provided an adjustable throttle valve for varying the magnitude of viscous damping of the fluid in the conduit means.

9. A vibration isolator as claimed in claim 3 wherein the square of the damping effects of the fluids in said vessel and said conduit referred to said container is within the range of 0.05 to 0.5 of the product of the virtual mass of the fluid in said vessel and said conduit and the static stiffness of said vessel and said conduit.

References Cited by the Examiner

UNITED STATES PATENTS

| | | | |
|---|---|---|---|
| Re. 20,887 | 10/38 | Mercier | 267—65 |
| 989,958 | 4/11 | Frahm | 248—20 X |
| 1,917,094 | 7/33 | Carlson | 248—7 |
| 1,973,510 | 9/34 | Schieferstein | 248—358 |
| 2,002,517 | 5/35 | Balduf | 115—34 |

FOREIGN PATENTS 782,933  9/57  Great Britain.

CLAUDE A. LE ROY, *Primary Examiner.*

FRANK L. ABBOTT, *Examiner.*